(12) United States Patent
Nikolic et al.

(10) Patent No.: US 12,494,038 B2
(45) Date of Patent: Dec. 9, 2025

(54) HARDWARE-BASED FEATURE TRACKER FOR AUTONOMOUS SYSTEMS AND APPLICATIONS

(71) Applicant: NVIDIA Corporation, Santa Clara, CA (US)

(72) Inventors: Zoran Nikolic, Sugarland, TX (US); Eric Viscito, Shelburne, VT (US)

(73) Assignee: NVIDIA Corporation, Santa Clara, CA (US)

(*) Notice: Subject to any disclaimer, the term of this patent is extended or adjusted under 35 U.S.C. 154(b) by 514 days.

(21) Appl. No.: 17/955,841

(22) Filed: Sep. 29, 2022

(65) Prior Publication Data

US 2024/0119701 A1   Apr. 11, 2024

(51) Int. Cl.
*G06V 10/75* (2022.01)
*G06V 10/62* (2022.01)
*G06V 20/56* (2022.01)

(52) U.S. Cl.
CPC .......... *G06V 10/751* (2022.01); *G06V 10/62* (2022.01); *G06V 20/56* (2022.01)

(58) Field of Classification Search
CPC ....... H04N 19/139; H04N 19/513–583; H04N 19/521; H04N 5/145; H04N 7/0157; H04N 19/51; H04N 7/014; H04N 19/182; H04N 19/523; H04N 7/0135–0147; G06T 7/20; G06T 7/246; G06V 10/62; G06V 10/751; G06V 10/25; G06V 10/771; G06V 10/7715; G06V 20/56; G06V 20/58; G08G 1/166
See application file for complete search history.

(56) References Cited

U.S. PATENT DOCUMENTS

| | | | |
|---|---|---|---|
| 6,192,156 B1* | 2/2001 | Moorby | G06T 7/251 |
| | | | 348/E13.008 |
| 2015/0365696 A1* | 12/2015 | Garud | H04N 19/53 |
| | | | 375/240.16 |
| 2017/0193669 A1* | 7/2017 | Poddar | G06T 7/246 |
| 2019/0068991 A1* | 2/2019 | Xu | H04N 19/587 |
| 2020/0244971 A1* | 7/2020 | Wang | H04N 19/172 |
| 2021/0065379 A1* | 3/2021 | Zhang | G06V 10/82 |

\* cited by examiner

*Primary Examiner* — Michael Horabik
*Assistant Examiner* — Stefano Anthony Dardano
(74) *Attorney, Agent, or Firm* — Taylor Duma L.L.P.

(57) ABSTRACT

In various examples, techniques for using hardware feature trackers in autonomous or semi-autonomous systems are described. Systems and methods are disclosed that use a processor(s) to determine flow vectors associated with pixel locations in a first image. The systems also use the processor(s) to determine a location of a feature point in a second image based at least on one or more of the flow vectors and a subpixel location of the feature point in the first image. In some examples, the processor(s) may include an optical flow accelerator (OFA) that includes a hardware unit storing a lookup table that is used to determine the location of the feature point in the second image. In some examples, the processor(s) may include an OFA to determine the flow vectors and a vision processor to determine the location of the feature point in the second image.

20 Claims, 22 Drawing Sheets

HARDWARE-BASED FEATURE TRACKER FOR AUTONOMOUS SYSTEMS AND APPLICATIONS

BACKGROUND

Tracking feature points—and thus an object or actor corresponding thereto, in some circumstances—through a sequence of images is common in various applications, such as for autonomous or semi-autonomous vehicle control. Existing systems typically rely on software to track feature points through a sequence of images, such as software executed using a central processing unit (CPU) and/or a graphics processing unit (GPU). However, in applications that require fast tracking of many feature points, the linear dependence of run time on the number of feature points may be prohibitive and may require excess or unavailable resources to implement in real-time or near real-time. As such, existing systems that use software to track feature points may be inadequate for some applications, such as automotive applications that require hundreds or thousands of feature points to be tracked.

Some existing systems may use hardware-accelerated processors to perform optical flow estimation over a sequence of images. For instance, a hardware-accelerated processor may estimate two-dimensional (2D) displacements of pixels between two images of a sequence of images. The hardware-accelerated processor may then use the 2D displacements of pixels to calculate the motion between the two images at discrete pixel locations (e.g., every pixel location). However, these processors may not be directly applicable to feature point tracking applications due to, as an example, the constraints on spatial locations of features. For instance, hardware-accelerated processors may not able to track feature points at subpixel locations within images, thus reducing the accuracy or precision of feature point tracking

SUMMARY

Embodiments of the present disclosure relate to hardware-based feature trackers for autonomous or semi-autonomous systems and applications. Systems and methods are disclosed that use one or more first processors (e.g., an optical flow accelerator, etc.) to process image data and, based on the processing, determine a flow vectors(s) associated with a pixel locations(s) in an image(s) represented by the image data. One or more second processors (e.g., the optical flow accelerator from the first processor(s), a programmable vision accelerator, etc.) may then process the flow vector(s) and, based on the processing, track a feature point(s) between images. For instance, to track a feature point at a subpixel location in an image, the second processor(s) may use a flow vector(s) for a pixel location(s) associated with the subpixel location to determine a flow vector for the feature point. The second processor(s) may then use the flow vector to determine a location of the feature point (e.g., a pixel location, another subpixel location, etc.) in a subsequent image. The systems may then output data indicating at least an identifier(s) of a tracked feature point(s), a location(s) of the tracked feature point(s), and/or any other information associated with the tracked feature point(s).

In contrast to conventional systems, such as those described above, the current systems, in some embodiments, perform feature point tracking using hardware and/or perform feature point tracking for large numbers of feature points. This may provide improvements over conventional systems that use software for feature point tracking. For instance, and as discussed herein, conventional systems that use software for feature point tracking may be unable to track a large number of feature points and/or may require excess programmable resources to do so. In contrast, the current systems, in some embodiments, are able to track a large number of feature points (e.g., hundreds of feature points, thousands of feature points, etc.) while using the resources of the processor(s) (e.g., without using or requiring excess resources). Additionally, this may provide improvements over conventional systems that use hardware-accelerated processors to perform optical flow estimation. For instance, and as discussed herein, conventional systems that use hardware-accelerated processors may not be directly applicable to feature point tracking problems due to constraints on feature spatial locations, such as for subpixel tracking. In contrast, the current systems perform feature point tracking using hardware and, in some embodiments, are able to perform subpixel feature point tracking using the hardware.

BRIEF DESCRIPTION OF THE DRAWINGS

The present systems and methods for hardware-based feature trackers for autonomous or semi-autonomous systems and applications are described in detail below with reference to the attached drawing figures, wherein.

DETAILED DESCRIPTION

Figure 1:
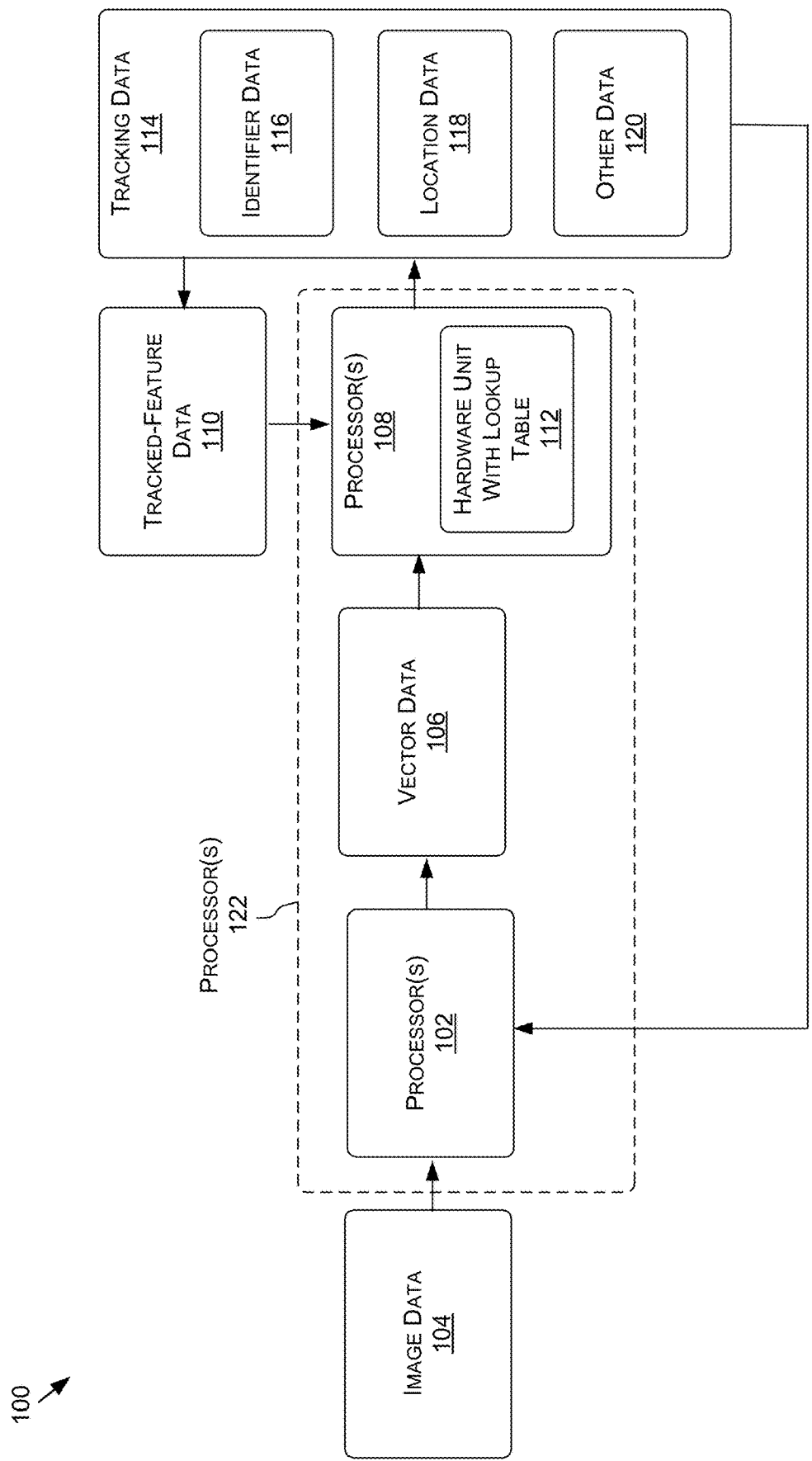
FIG. 1 illustrates an example data flow diagram for a process of performing feature tracking using hardware, in accordance with some embodiments of the present disclosure.

Systems and methods are disclosed related to hardware-based feature trackers for autonomous or semi-autonomous systems and applications. Although the present disclosure may be described with respect to an example autonomous or semi-autonomous vehicle 800 (alternatively referred to herein as "vehicle 800" or "ego-machine 800," an example of which is described with respect to FIGS. 8A-8D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to feature tracking in autonomous or semi-autonomous machine applications, this is not intended to be limiting, and the systems and methods described herein may be used in augmented reality, virtual reality, mixed reality, robotics, security and surveillance, autonomous or semi-autonomous machine applications, and/or any other technology spaces where feature tracking may be used.

For instance, a system(s) may receive image data (or more generally, sensor data) generated using one or more sensors, such as image data generated using one or more cameras or image sensors of a vehicle or other machine type. The system(s) may then process the image data using a first processor(s) (e.g., an accelerator, optical flow accelerator, etc.) that is configured to determine motion between feature points in images represented by the image data. In some examples, to determine the motion, the first processor(s) may be configured to perform optical flow estimation using the images represented by the image data. As described herein, optical flow estimation may include estimating two-dimensional (2D) displacements of pixels between two or more images (e.g., two or more images corresponding to different times, two or more images corresponding to a same time but generated using different sensors, or a combination thereof). Optical flow estimation may then include using the 2D displacements of pixels to calculate the motion between the two images at pixel locations (e.g., every pixel location), where the motion may be represented using flow vectors (also referred to as "displacement vectors" or "motion vectors") associated with the pixel locations. For instance, the first processor(s) may use optical flow estimation to determine a respective flow vector for one or more pixel locations (e.g., each discrete pixel location) in the images.

The system(s) may then process the flow vector(s) using a second processor(s) (e.g., the first processor(s), a programmable vision accelerator, another accelerator, etc.) to track a feature point(s) between the images. For a first example, if a feature point is associated with a discrete pixel location in an image, then the second processor(s) may use the flow vector associated with the discrete pixel location to determine a location for the feature point in another, subsequent image. For a second example, if a feature point is associated with a subpixel location in an image, then the second processor(s) may determine one or more discrete pixel locations that are associated with the subpixel location. In some examples, the second processor(s) determines the discrete pixel location(s) based on the subpixel location at least partially overlapping with the discrete pixel location(s). The second processor(s) may then use a flow vector(s) associated with the discrete pixel location(s) to determine the location of the feature point in another, subsequent image. In some examples, the second processor(s) determines the location by interpolating the flow vector(s) in order to determine a flow vector associated with the subpixel location. The second processor(s) then uses that flow vector to determine the location of the feature point in the subsequent image.

In some examples, the system(s) may perform one or more processes in order to create a new track for a new feature point and/or terminate an existing track for a feature point. For a first example, to create a new track for a feature point, the system(s) (e.g., the second processor(s), etc.) may identify a pixel location that is not associated with a tracked feature point(s) (e.g., a pixel location for which a subpixel location(s) of a tracked feature point(s) does not overlap with the pixel location). The system(s) (e.g., the second processor(s), etc.) may then generate a new track for the feature point associated with the pixel location. While this is just one example technique that the system(s) (e.g., the second processor(s), etc.) may use to generate a new track for a feature point, in other examples, the system(s) (e.g., the second processor(s), etc.) may generate a new track based on one or more additional and/or alternative techniques.

For a second example, to terminate an existing track for a feature point, the system(s) (e.g., the second processor(s), etc.) may perform the processes described herein to determine a flow vector(s) for a pixel location(s) that is associated with the subpixel location of the feature point. The system(s) (e.g., the second processor(s), etc.) may then terminate the track for the feature point based on the flow vector(s). In some examples, such as when there are multiple flow vectors for multiple pixel locations associated with the subpixel location, the system(s) (e.g., the second processor(s), etc.) may terminate the track for the feature point based on ending locations of the flow vectors being outside of a threshold distance from one another and/or the flow vectors being directed in different directions. For instance, the system(s) (e.g., the second processor(s), etc.) may terminate the track when a standard deviation associated with the flow vectors satisfies (e.g., is equal to or greater than) a threshold standard deviation. In some examples, the system(s) (e.g., the second processor(s), etc.) may terminate the track for the feature point based on one of the flow vector(s) having been labeled invalid (e.g., the flow vector not including an ending point in the subsequent image). While these are just a couple of example techniques that the system(s) (e.g., the second processor(s), etc.) may use to terminate a track for a feature point, in other examples, the system(s) (e.g., the second processor(s), etc.) may terminate a track based on one or more additional and/or alternative techniques.

While the examples described herein are related to tracking feature points located at discrete pixel locations and subpixel locations, in other examples, similar processes may be used to track feature points at other types of locations. For instance, similar processes may be used to track feature points associated with points (e.g., points in a point cloud, etc.), feature points associated with cells, feature points associated with groups of pixels, and/or the like. For example, although primarily described with respect to image data, the systems and methods described herein may be implemented using sensor data generated from sensor modalities other than cameras or image sensors, such as LiDAR sensors, RADAR sensors, ultrasonic sensors, and/or the like. In addition, although primarily described with respect to tracking feature points through a sequence of images (e.g., between a first image generated a first time and a second image generated at a second, later time), this is not intended to be limiting. For example, in some embodiments, the systems and methods described herein may be used to additionally or alternatively track feature points between images (or other sensor data representations) generated at substantially a same time using two or more different sensors (e.g., two or more sensors with at least partially overlapping fields of view).

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, object tracking systems, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, object tracking systems, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 illustrates an example data flow diagram for a process 100 of performing feature tracking using hardware, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 800 of FIGS. 8A-8D, example computing device 900 of FIG. 9, and/or example data center 1000 of FIG. 10.

The process 100 may include a first processor(s) 102 processing image data 104 generated using one or more sensors. As described herein, the first processor(s) 102 may include any type of processor, such as, but not limited to, an accelerator (e.g., an optical flow accelerator). The image data 104 may be generated by one or more cameras, such as one or more red-green-blue (RGB) cameras, one or more infrared (IR) cameras, and/or any other type of camera. In the example of FIG. 1, the image data 104 may represent a sequence of images, such as a first image generated at a first time, a second image generated at a second time, a third image generated at a third time, a fourth image generated at a fourth time, and/or so forth. Additionally, the first processor(s) 102 may be configured to process the image data 104 in order to determine motion between feature points in the images represented by the image data 104.

In some examples, to determine the motion, the first processor(s) 102 may perform optical flow estimation on the images represented by the image data 102. As described herein, the first processor(s) 102 may perform optical flow estimation by estimating two-dimensional (2D) displacements of pixels between two images. The first processor(s) 102 may then use the 2D displacements of pixels to calculate the motion between the two images at pixel locations (e.g., every pixel location), where the motion may be represented by flow vectors for the pixel locations. For instance, the first processor(s) 102 may use optical flow estimation to determine a respective flow vector for one or more pixel locations (e.g., each discrete pixel location) in the images. The first processor(s) 102 may then output vector data 106 representing the flow vectors for the pixel locations.

Figure 2A:
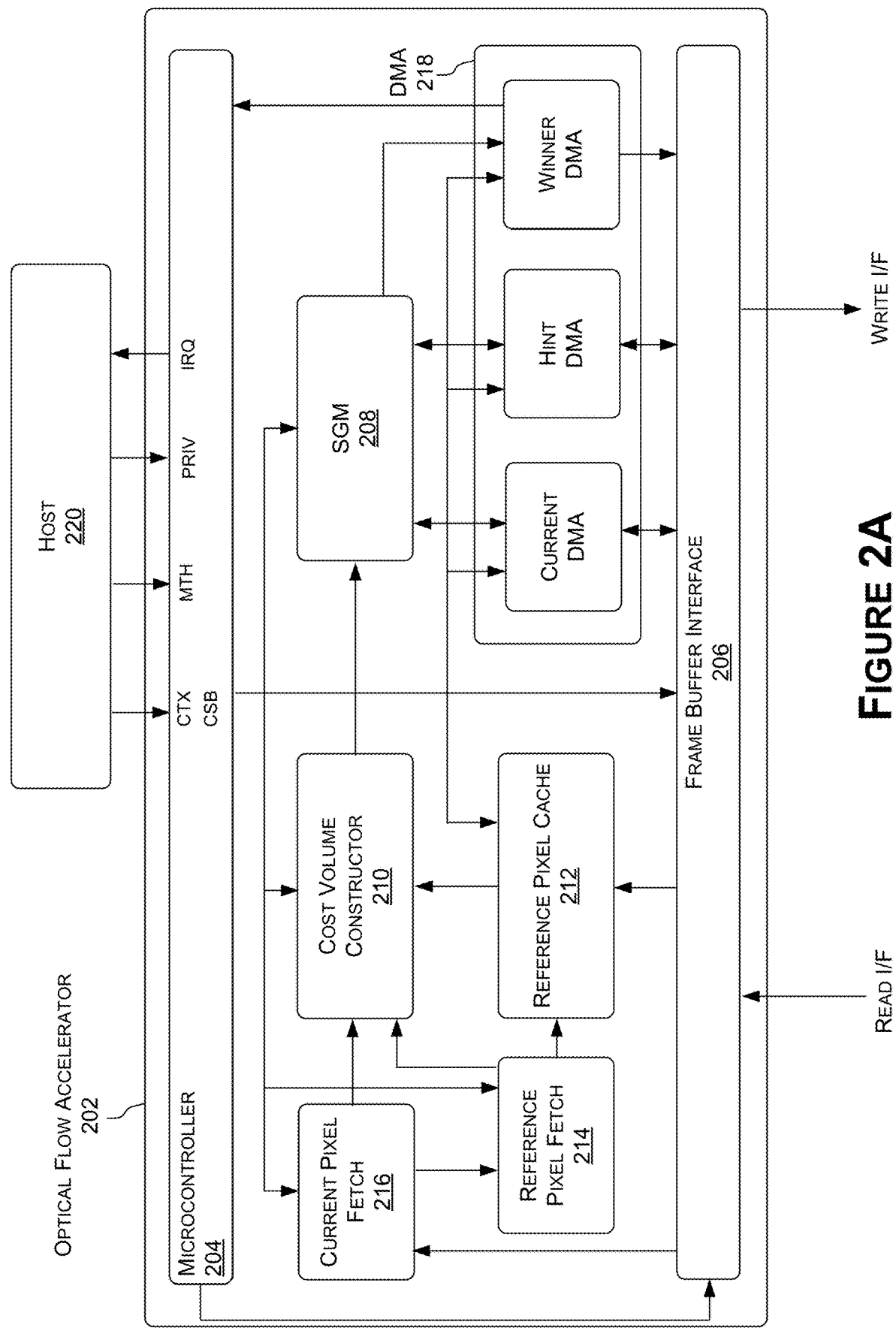
FIGS. 2A-2C illustrate an example of circuitry of an Optical Flow Accelerator (OFA), in accordance with some embodiments of the present disclosure.

For instance, FIG. 2A illustrates an example of circuitry of an optical flow accelerator (OFA) 202 (which may represent, and/or include, at least one of the first processor(s) 102), in accordance with some embodiments of the present disclosure. As shown, the OFA 202 circuitry comprises a microcontroller 204, a framebuffer interface 206, a semi global matching (SGM) block 208, a cost volume constructor (CVC) block 210, a reference pixel cache (RPC) block 212, a reference pixel fetch (RPF) block 214, a current pixel fetch (CPF) block 216, and a DMA block 218.

The microcontroller 204 in the OFA 200 connects to a host 220 from which it receives instructions and data. The microcontroller 204 also connects multiple components in the OFA 202 to control the operations in the OFA 202 in accordance with instructions received from host 220. The microcontroller 204 has interfaces for signals such as, for example, context switch signals, microcode for certain instructions, addresses and other data, privilege buses, and interrupt interfaces with the host 202. The microcontroller 204 may process the microcode, addresses, data, and/or other signals received and drive the rest of the OFA 202. The microcontroller 204 may performs error handling, and may perform additional or alternative tasks such as, for example, rate control and general (e.g., macroblock level) housekeeping, tracking, and/or mode decision configuration.

The framebuffer interface 206 may allow the OFA 202 to read from and write to a frame buffer. For example, data such as the image frames that are input to the OFA 202 may be read into the OFA 202 via the framebuffer interface 206 in accordance with control signals received from the microcontroller 204. The optical flows and disparity maps generated as output by the OFA 202 may be written to the framebuffer via the framebuffer interface 206.

The SGM block 208 includes circuitry for 1D and/or 2D SGM operations, historical and/or temporal path cost generation, and/or winner decision. The SGM block 208 may also support aspects of post-processing. According to some examples, the SGM circuitry includes support for three different types of searches for pixel differences (disparities), for example, along horizontal lines, along epipolar lines, and/or in a rectangular area pointed by a "hint" (e.g. fixed 23×11 pixel search region around hint provided by the CPF block 216).

The SGM block 208 may be configurable to allow the 1D/2D SGM to be performed along a configurable number of paths (e.g., 4 or 8 paths). The SGM processing may also be configurable for different disparity levels (e.g., 128 or 256 disparities) for stereo SGM and epipolar SGM. The "disparity levels" parameter defines the search space used for matching. For example, when the disparity level is D, for each pixel p in the base image, D pixels in the reference image are searched for matching creating D disparity levels associated with p.

The SGM block 208 may additionally, in some examples, implement any or none of equiangular subpixel interpolation, adaptive smoothing penalties, and eSGM and wavefront processing (e.g., for bandwidth saving). The equiangular subpixel interpolation can be performed for subpixel refinement, and, in some examples, may be enabled or disabled based on a configuration parameter.

The SGM implementation in the OFA 202 may provide a unified architecture for both SGM based optical flow and stereo disparity, and may provide configurable scalability between quality and performance. The SGM implementation may also provide for configurable motion vector/disparity granularity (e.g., minimum 1×1 to maximum 8×8), configurable number of disparity levels and search range, and/or cost calculation on original resolution to preserve matching precision.

The SGM block 208 adapts SGM to be applied to 2D areas in order to, among other aspects, more accurately and reliably detect foreground objects and motion. A pyramidal approach may be implemented to reduce the complexity of applying SGM in 2D and to facilitate hardware implementation of the technique. The SGM implementation in some examples may also include a wavefront processing mode and eSGM which can reduce the required bandwidth. In some embodiments, eSGM is further refined to achieve 1.5× improvement in performance compared to the original eSGM. Reduced cost precision can be used in some examples to narrow the required datapath width without a noticeable reduction in quality.

The CVC block 210 includes circuitry to generate the cost volume corresponding to input images. The "cost volume" (also called "matching cost volume") may include a three-dimensional array in which each element represents the matching cost of a pixel at a particular disparity level. The CVC block 210 may be configured for two major functions: performing census transform (e.g., 5×5 census transform) for both current and reference pixels and calculating the hamming distance between current and reference pixel census transformed data blocks (CT data blocks).

The CPF block 216 operates to obtain the next pixel to be evaluated. The RPC block 212 and the RPF block 214 operate to obtain and store the reference pixels that correspond to each pixel fetched by the CPF block 216. The RPC 212 is the cache for storing reference pixels, and may reduce the memory bandwidth due to reference pixel fetch. The RPC block 212 accepts the fetch request from the RPF block 216, fetches the reference pixels from external memory, and outputs reference pixel block to the CVC block 210.

The CPF block 216 includes circuitry for fetching the current pixel and, when applicable, fetching the hint. For example, although the CPF block 216 is mainly for current pixel fetch, in some examples, the CPF block 216 also fetches the corresponding hint (e.g., indicating areas to be evaluated) when the OFA 202 is in pyramidal SGM optical flow mode. In some examples, due to the zigzag processing of the OFA 202, the CPF block 216 may fetch the current pixels in an order corresponding to that pattern. In some examples, fetching the current pixel includes fetching a current pixel block of a size such as, for example, 9×9 pixels. That is, due to OFA features such as 5×5 census transform and 5×5 cost aggregation, the fetching of a block of a size such as 9×9 for each current pixel may be necessary.

The DMA block 218 may include separate circuitry for the DMA of different data. One or more of the DMAs (e.g., each DMA) may be configured to offload the loading or storing of a particular data set from the microcontroller 204 and/or other circuit blocks. The OFA 202 may have several DMAs 218, including a current DMA 218 which fetches current pixel data; a hint DMA 218 which fetches hint motion vector data; and/or a winner and output DMA 218 which outputs flow/disparities and costs to temporary/history buffers which read/write temporary path cost/candidates info required by the SGM block 208 or other memory. According to an example, the current pixel DMA 218 is a read only DMA 218 and allows the SGM block 208 to support fetch requests of a pixel size (e.g., 32×8 pixels), the hit DMA 218 is a read only DMA 218 and supports fetch request of a motion vector size (e.g., 8×8 motion vectors (e.g. 32×8 bytes)), the winner flow DMA 218 and the winner cost DMA 218 are each configured as write only and supports write requests of a particular size (e.g., 32×8 bytes).

The general programming model for the OFA 202 may be similar to that of many host-based engines like hardware video decoders and encoders. In some examples, the programming model includes the driver software (executing on a processor such as a CPU or GPU) allocating the image surfaces, preparing the required input information, and then activating the microcontroller 204 of the OFA 202. Microcode on the microcontroller 204 may parse the input information/commands and configure hardware registers, and then activate (e.g., initiate or trigger) the OFA 202 to perform the processing required by the input information/command.

When the OFA 202 is triggered (e.g., kicked off by the microcontroller 204 as commanded by the driver), the CPF block 216 starts first and sends the command to the RPF block 214. The RPF block 214 transfers the command to the CVC block 210 and starts the RPC block 212 for reference pixel fetch. When reference pixels and current pixels are ready, the CVC block 210 calculates the cost and sends them to the SGM block 208. The SGM block 208 does the decisions and sends its results to the DMA block 218. The DMA block 218 handles all the internal framebuffer interface 206 requests with proper formats.

The OFA 202 may be configured to issue an SGM pass done interrupt to the microcontroller 204 once it finishes one pass of SGM processing. Microcode in the microcontroller 204 may keep track of SGM passes completed, and may be configured to report the frame (or subframe) completed status to the driver so that the driver can control the next frame (or subframe) kickoff.

The OFA 202, in some examples, may support input images and output flow maps of any size. Some examples support any image size between 32×32 pixels to 8192×8192 pixels as input, and output flow map or disparity map size may be based on the input image size and the grid size. For example, the output flow map height may be based on the input image height multiplied by (K x grid size y), and output flow map width may be based on the input image width multiplied by (K x grid size x), where K (e.g., K=1 or 2) may be configurable to enable/disable down-sampling. In some examples, the size of the input hint height/width (e.g., in pyramidal SGM mode) may be based on input image height/width and grid size and may be similarly configurable based on K.

Figure 2B:
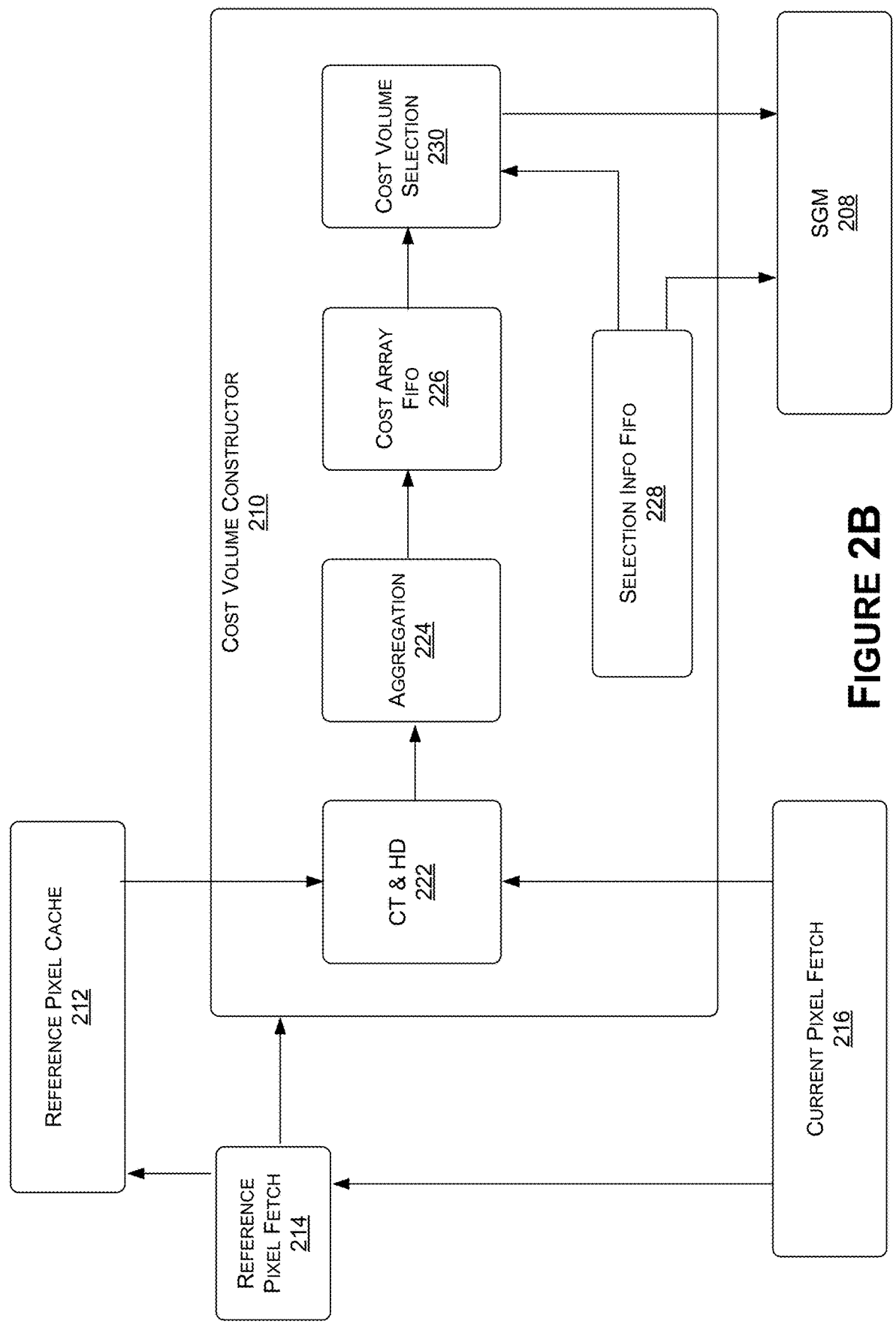

FIG. 2B schematically illustrates circuitry of the CVC block 210 of the OFA 202, in accordance with some example embodiments of the present disclosure. As noted above, the CVC block 210 is configured to generate the cost volume for determining optical flow and stereo disparity. The CVC block 210 performs census transform (e.g., 5×5 pixel census transform) for both a current pixel and a reference pixel, and calculates the distance (e.g., hamming distance) between current and reference CT data blocks. According to some examples, stages of processing in the CVC 210 include a CT & HD block 222, an aggregation (AGG) block 224, a cost array FIFO block 226, a selection information FIFO block 228, and a cost selection (CVS) block 230.

The CT&HD block 222 performs census transform and hamming distance calculations. The census transform (CT) is a robust patch representation introduced by Zabih and Woodfill in "Non-parametric Local Transforms for Computing Visual Correspondence", in *Proceedings of the Third European Conference—Volume II on Computer Vision* (ECCV '94), Jan-Olof Eklundh (Ed.), Vol. II. Springer-Verlag, London, UK, 151-158, which is hereby incorporated in its entirety. The census transform R(P), which may be used in some examples, is a non-linear transformation which maps a local neighborhood surrounding a pixel P to a binary string representing the set of neighboring pixels whose intensity is less than that of P. Each census digit ξ(P, P') is defined by the following relationship.

$$\xi(P, P') = \begin{cases} 0, & P > P' \\ 1, & P \leq P' \end{cases} \quad (1)$$

That is, for a pixel P, each pixel P' in its neighborhood is represented as a 1 or a 0 based on whether P' is greater than or equal to or is lesser than P, respectively. The size of the local neighborhood of pixel P for census transform may be configurable. Based upon an output quality versus chip area tradeoff for the OFA circuitry, in some examples, a 5×5 census transform is used in the OFA 202 (although other census transforms may be used in other examples).

For each pixel P, the census transformed binary strings representing the set of neighboring pixels for two images is then subjected to the hamming distance (HD) determination. The HD is a distance metric used to measure the difference of two-bit string values. In the context of the CT, the HD is the number of the different bits in two CT strings. The HD for pixel P can be determined by XOR'ing the two-bit strings.

As a pixel(s) (e.g., each pixel) in a base image is obtained as the current pixel for processing, the CT&HD block 222 receives a current pixel block (e.g., a 5×5 pixel block with current pixel p as the center pixel) from the base image as obtained by the CPF block 216 and a reference pixel block (e.g., a pixel block with reference pixel p' as center pixel) from the reference image retrieved from the RPC block 212. The reference pixel block may be of size W×H, where W and H can be chosen so that the number of pixels in the data block equals the number of disparity levels such that W×H=D. The reference pixels corresponding to the current pixel may be cached in RPC block 212 upon the RPF block 214 being triggered to fetch the corresponding reference pixel by the CPF block 216 which provides the RPF block 214 with the current pixel and/or the current pixel motion vector hint (in pyramidal SGM) or information thereof. The CPF block 216 and RPC block 212 can read the pixels and/or pixel data from a framebuffer through the framebuffer interface 206.

Thus, the CT&HD block 222 processes a pixel(s) (e.g., each pixel) of a current base image by receiving the corresponding current and reference pixel blocks from the CPF block 216 and the RPC block 212, respectively. The current pixel block for pixel p, may be a 5×5 pixel block, in some examples, with p as center pixel. The current pixel block may be submitted to the census transform, converted to a block of 1s and 0s and further to a bit string. Thus, after being subjected to the census transform, the current pixel p is represented by a bit string that corresponds to its neighborhood (e.g., such as the 5×5 neighborhood in this example). In some examples, for the reference pixel block for pixel p, the CT&HD block 222 may generate a census transformed bit string for each pixel p' in the W×H pixel reference pixel block.

The HD circuitry in block 222 calculates, for a pixel(s) (e.g., each pixel) p' in the reference pixel block, a bit-wise XOR of the census transformed bit strings (or census transformed bit strings after aggregation in the AGG block 204) for the current pixel p and reference pixel p' in order to determine the hamming distance corresponding to each p'. In order to generate D disparity levels for current pixel p, D Hamming distance computations are performed in the CT&HD block 222. The matching cost for D disparity levels at a given pixel position, p, in the base image is computed by computing the Hamming distance with D pixels in the reference image. The matching cost, C(p,d), may be computed at each pixel position, p, for each disparity level, d, where 1≤d≤D.

Cost aggregation in the aggregation block 224 is used, in some examples, for improving the robustness of matching. Cost aggregation may be desired because single-pixel-based cost may be ambiguous and/or erroneous. In order to perform cost aggregation, neighbor pixel costs are added (e.g., summed) to the center pixel. In some embodiments, the summed pixel costs at the center pixel can be averaged to reduce the cost width (e.g., to reduce the number of bits to represent the summed costs). The cost aggregation window size used in the OFA 202 may be configurable. In some examples, the cost aggregation window is 5×5 pixels. Cost aggregation can be applied to each reference pixel p' after the disparities calculated (e.g., by Hamming distance calculations as described in relation to the CT&HD block 222) to adjust the matching cost at an individual pixel (e.g., each pixel) p'. Additionally, or alternatively, cost aggregation can be performed on the census transformed bit strings for an individual pixel (e.g., each pixel) p' before the disparities are calculated and consequently adjust the respective reference pixel bit strings in accordance with its neighborhood (e.g., a 5×5 aggregation window with reference pixel p' as center pixel) before they are subjected to the Hamming distance calculation with the census transformed bit string of current pixel p.

The cost array block 226 receives the matching costs for the reference pixels p' from the aggregation block 224, or in some examples, directly from the CT&HD block 222. The block 226 may implement a first-in-first-out (FIFO) storage to store the received bit strings.

The cost volume selection block 230 receives the cost arrays for an individual current pixel (e.g., each current pixel) p, and supplies the costs as required by the SGM block 208. Because of the irregular search pattern in epipolar SGM optical flow mode, the cost calculation (e.g., in cost volume selection block 230) may be performed over a 16×16 pixel block. Then the costs at valid locations are selected and sent to the SGM block 208 in accordance with the search pattern. The selection of valid locations may be based upon input from the selection information FIFO block (SIF block) 208. The SIF block 208 provides the SGM block 208 with motion vectors corresponding the current pixels.

Figure 2C:
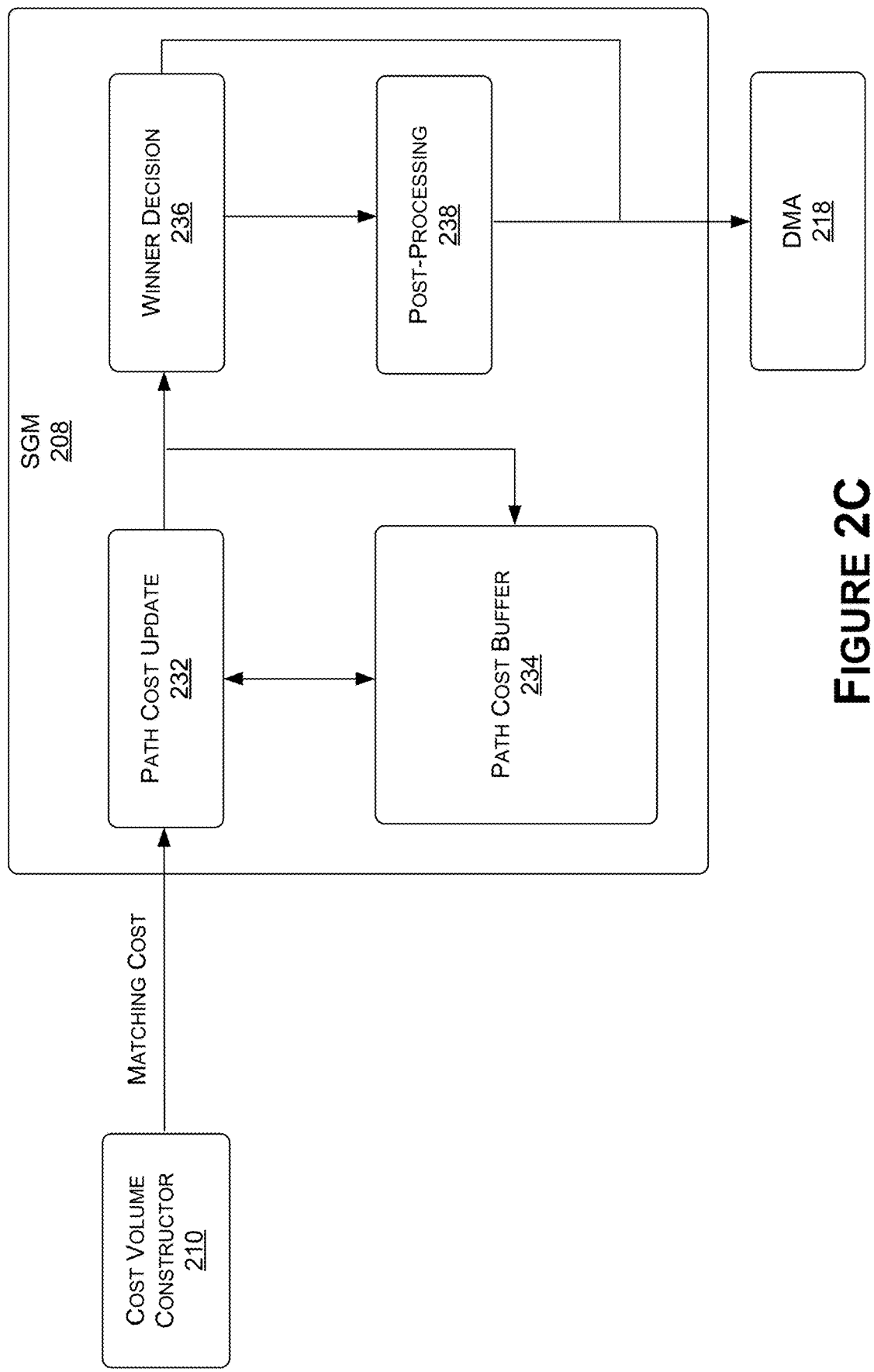

FIG. 2C is a schematic block diagram of the hardware SGM block 208, in accordance with some examples of the present disclosure. In the OFA 202, the SGM block 208 is the subunit that receives the matching costs from the CVC block 210, performs 1D/2D SGM, and does post-processing on the resulting disparity (e.g., winner disparity). The matching costs from the CVC 210 are received by a path cost update block 232, which also receives a previous path cost from a path cost buffer 234. The path cost output from the path cost update block 232 is stored in the path cost buffer 234. The path cost update block 232 output may be provided to a winner decision block 236, which receives a previous winner value after the post-processing. The winner decision that is output from the winner decision block 236 is provided to a post-processing block 238. After the post-processing, the result is provided back to the winner decision block 236, and also to the DMA block 218.

Key features supported by the SGM block 208, in some examples, include supporting a configurable maximum number of disparities (e.g. 256 or 128 disparities, where the lower number of disparities may be selected for faster performance), supporting configurable number of directions in which to evaluate matching costs (e.g. 2/4/8: (horizontal+vertical)/(horizontal+vertical+left+right)/(horizontal+vertical+left+right+diagonal)), and/or supporting a configurable number of SGM passes (e.g. 1/2/3).

Post-processing may be performed in order to fix errors that an algorithm has caused and providing a dense disparity image without gaps. The post-processing performed in the SGM block 208 may include subpixel interpolation, xy-index to motion vector conversion, disparity to motion vector conversion, and/or the like.

Figure 2D:
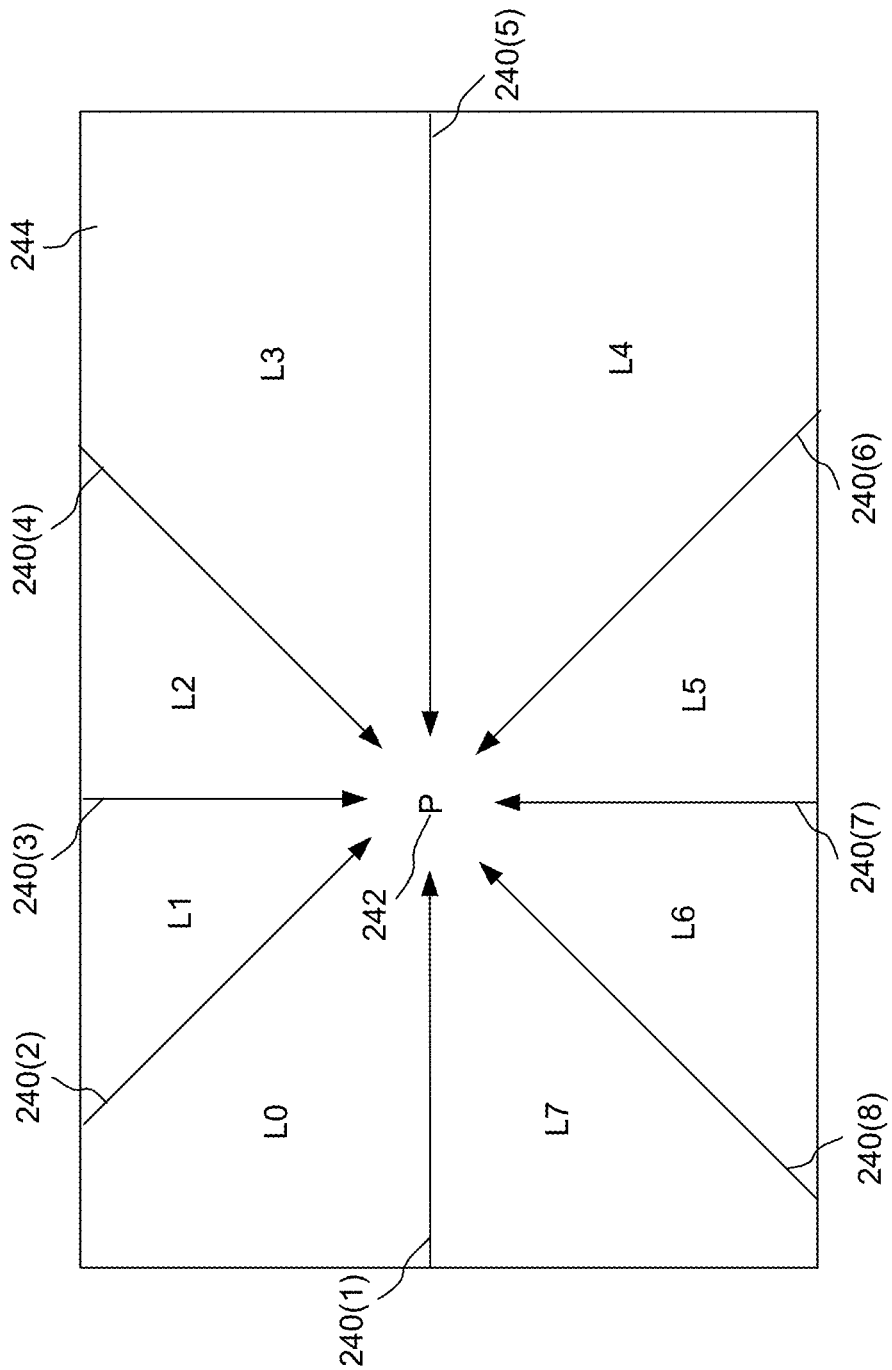
FIG. 2D illustrates example path directions that are configurable for semi global matching (SGM) computations, in accordance with some embodiments of the present disclosure.

FIG. 2D illustrates example path directions 240(1)-(8) (also referred to singularly as "path direction 240" or in plural as "path directions 240") for the SGM 208 that may be used in some examples. In some examples, the number of paths 240 considered when determining path costs for a pixel p 242 may be configurable. For example, in the illustrated image frame 244, the matching cost associated with the pixel p 242 can be determined based on four paths (e.g., up L2, down L6, left L0, right L4) or eight paths (e.g. L0-L7). Some other examples may use another subset of the eight paths L0-L7 and/or additional paths.

In some examples, the 1D SGM used in epipolar SGM optical flow mode is a 1D SGM process that is the same as in a stereo case. The input to this stage is the matching cost volume or part thereof that is generated from cost volume construct stage, the output is the best disparity with the minimum aggregated path cost from all directions. The 1D minimum aggregated cost path determination includes computing the current cost at d disparity position using the matching cost value, the previous cost values at disparities d−1, d, and d+1, and the minimum of the previous cost values.

Figures 2E, 2F, 2G:
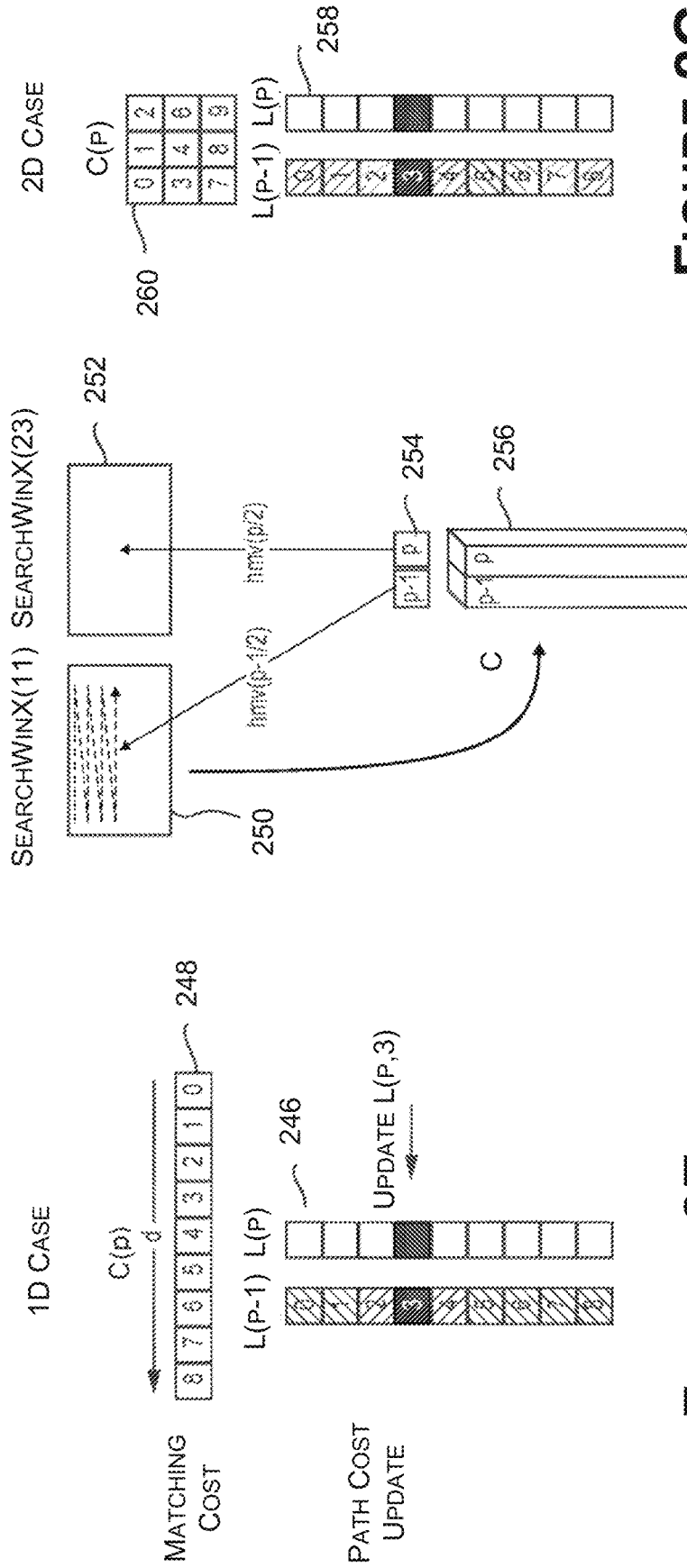
FIG. 2E illustrates matching cost determinations in one dimensional examples, in accordance with some embodiments of the present disclosure.
FIGS. 2F-2G illustrate matching cost determinations in two-dimensional examples, in accordance with some embodiments of the present disclosure.

FIG. 2E shows an example path cost update in 1D SGM optical flow. Each array 246, which represents path costs L(p, d) and L(p−1,d), includes d path costs. The notation L(p,d) represents the path cost along path L for pixel p at disparity level d. The C(p) cost array 248 shows corresponding matching costs for pixel p, for d pixels, along one path.

In some examples, the path cost L update for pixel p along a direction r for d disparity levels is as follows:

$$L_r(p,d)=C(p,d)+S(p,d)-\min_i L_r(p-r,i) \quad (2)$$

$$\text{where } S(p, d) = \min \begin{cases} L_r(p-r, d) \\ \min L_r(p-r, d \pm 1) + P1 \\ \min_i L_r(p-r, i) + P2 \end{cases} \quad (3)$$

Basically, in this recursive computation, in order to determine the path cost L for a pixel p along a path r, all path costs from the previous pixel along direction r (represented as "p−r"), and two penalty terms P1 and P2 are used. The first term (C(p,d)) is the sum of all pixel matching costs for the disparities of d. The second term adds a constant penalty P1 for all pixels q in the neighborhood $N_p$ of p, for which the disparity changes a little bit (e.g., 1 pixel). The third term adds a larger constant penalty P2 for all larger disparity changes. Using a lower penalty for small changes permits an adaptation to slanted or curved surfaces. The constant penalty for all larger changes (e.g., independent of their size) preserves discontinuities. P1 and P2, in relation to SGM techniques, are referred to as matching cost smoothing penalty 2D.

As an optimization technique in some embodiments, in addition to storing all the path cost values, the minimum path cost of previous pixels are also stored in an on-chip buffer to avoid recalculating $\min_i L_r(p-r, i)$.

Certain examples adapt the SGM technique, which was originally proposed for searching along 1D paths, to be used in 2D. For example, whereas stereo disparity and epipolar SGM (e.g., in the static word optical flow mode) use the 1D implementation of SGM in the system, the pyramidal SGM implementation (e.g., in the general word optical flow mode)

is based on a 2D implementation. FIG. 2F illustrates example search windows 250 and 252 and search patterns that are used for updating path costs for a pair 254 of pixels p and p−1, and the corresponding path cost data structure 256. FIG. 2G shows how the path costs 258 for pixels p and p−1 can be updated when in 2D implementation. In the 2D example, the C(p) 260 cost array is two dimensional and corresponds to the 2D search area such as the search window 250 or 252. One of the key changes from 1D to 2D in SGM examples, in some examples, is the path cost update part (v corresponds to a motion vector in the following equation) which can be represented as:

$$L_r(p, v) = C(p, v) + S(p, v) - \min_i L_r(p - r, i) \quad (4)$$

where $$S(p, v) = \min \begin{cases} L_r(p - r, v) \\ \min_{\|\hat{v} - v\| < R} L_r(p - r, \hat{v}) + P1 \\ \min_i L_r(p - r, i) + P2 \end{cases} \quad (5)$$

To reduce hardware implementation complexity, in some examples, the search window is set to 2/1 in x/y directions, and v can be used to identify a candidate area in the search window.

The SGM technique may include a bandwidth for read/write of the temporal path matching cost volume that is too large for hardware implementation. In order to address this issue, some examples implement a variant of the SGM techniques. For instance, the temporal bandwidth buffer size according to some techniques may include:

$$\text{temporal } BW = W \times H \times d\text{Max} \times \text{bytesPerCost} \quad (6)$$

The eSGM method can reduce the required temporal buffer size to:

$$\text{temporal } BW(\text{eSGM}) = W \times H \times (\text{pathNum} \times (\text{bytesPerDisp} + \text{costNum} \times \text{bytesPerCost}) + \text{bytesWinnerDisp} + \text{bytesWinnerCost}). \quad (7)$$

In hardware implementation in some examples, the number of aggregation paths ("pathNum") is set to 3 and bytes per disparity ("bytesPerDisp") is 1, number of costs ("costNum") is 3 for subpixel interpolation, bytes per cost ("bytesPerCost") is 1, bytes per winner disparity/cost ("bytesWinnerDisp/Cost") is 2. For 2D SGM, the costNum is 5 and bytesWinnerDisp is 4 due to need to handle mvx/mvy components.

In some examples, a 3-pass processing is implemented for eSGM. In order to improve performance (e.g., improve speed of the disparity calculation) in some environments, a simplified 2-pass version may be selected in some examples. The SGM block in some examples may support both 2 pass/3 pass eSGM.

Figure 2H:
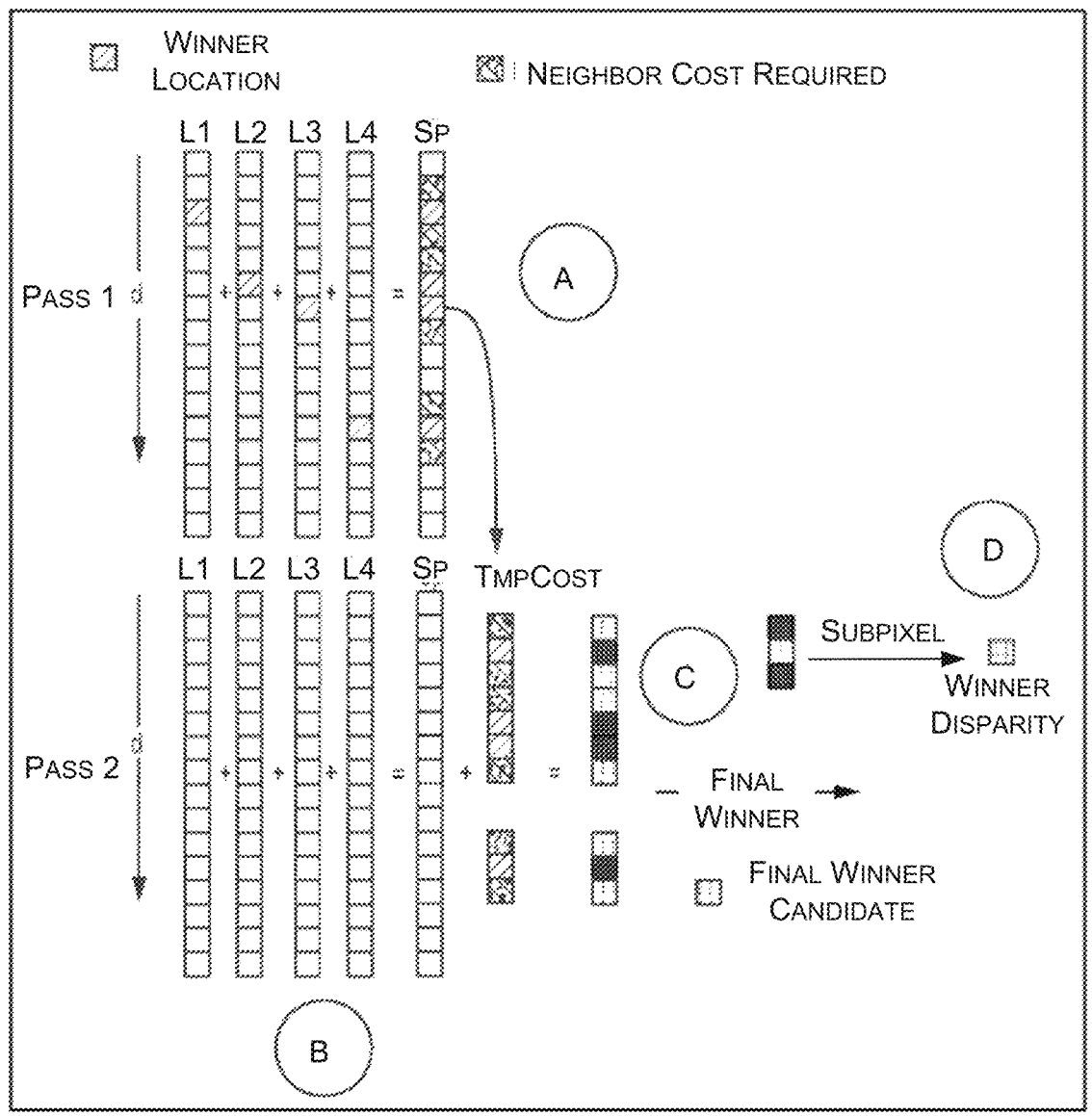
FIGS. 2H-2I illustrate multiple iterations of SGM, in accordance with some embodiments of the present disclosure.
Figure 2I:
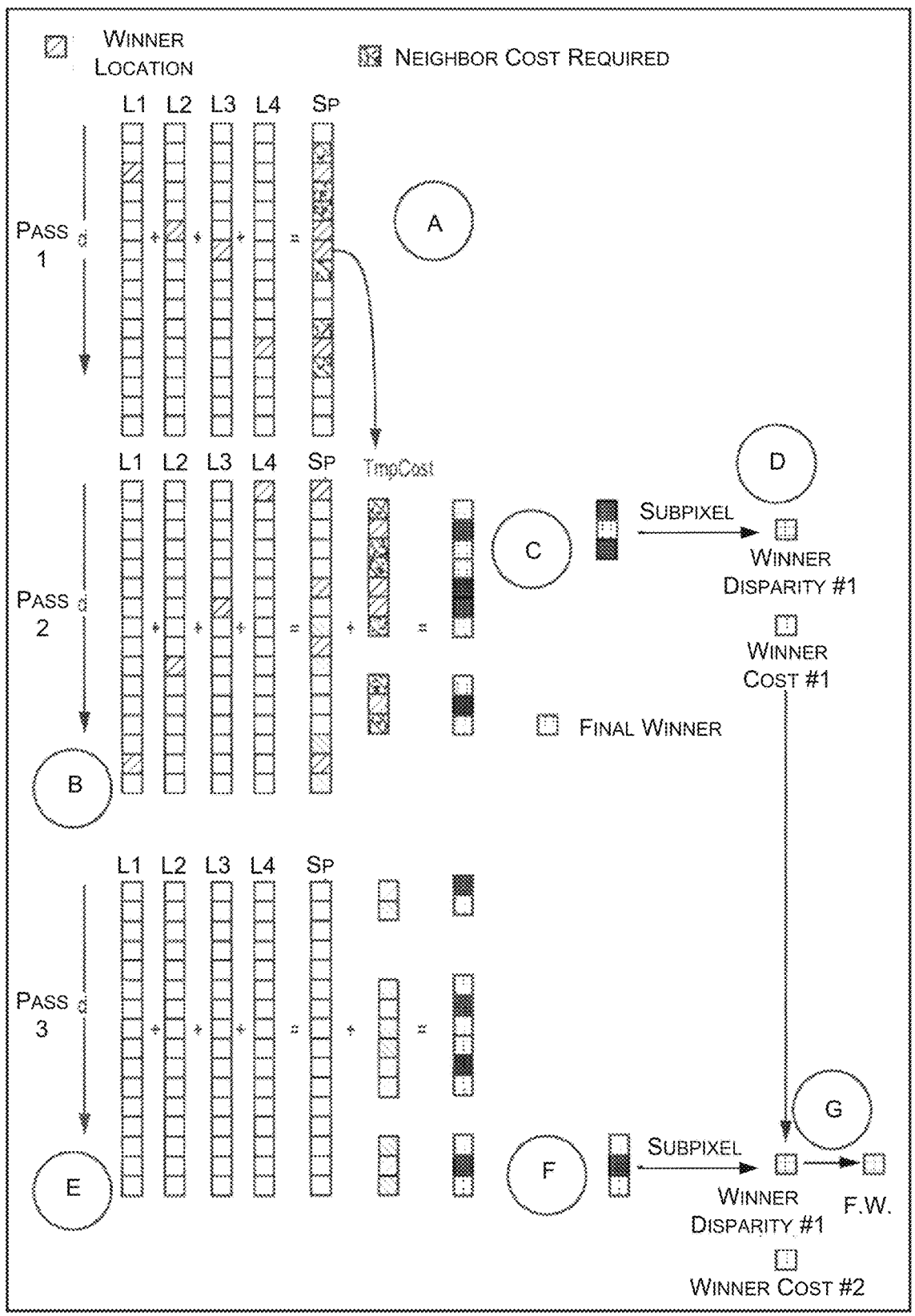

FIGS. 2H and 2I graphically illustrates a two-pass SGM performance and a three-pass SGM performance, respectively, in accordance with some embodiments of the present disclosure. In FIG. 2H, operation "A" shows the first pass in which the path cost array for each of paths L1, L2, L3 and L4 have a winner pixel identified by a shading pattern. The sum of all path costs is represented by the "Sp" array. "Sp" represents the winner pixels from each of the four paths and also identifies the pixels adjacent to the winner pixels, as pixels for which neighbor information is required.

In some examples, the first pass is performed from the upper left of the image to the bottom right. For each pixel, Calculate $L_r^1(p,d)$ for the 4 directions, and Get $\min_i(L_r^1(p,i))$ and the corresponding $d_{min}^1$, write out $Sp_r^1(p,d_{min}^1), Sp_r^1(p,d_{min}^1 \pm 1), d_{min}^1$, where $L_{direction}^{\#pass}$((pixel location, disparity))

and $Sp_{direction}^{\#pass}$(pixel location, disparity). (8)

Operation "B" shows the second pass (no winners are shown) and illustrates the determination of final winner candidates in operation "C". The sum array from the first pass is summed with the sum of all path costs obtained in the second pass to generate the final winner candidate array. Then, the final winner is selected from the final winner candidate array. Then at operation "D", the final winner is subjected to subpixel refinement, in order to generate the final disparity.

In some examples, the second pass is performed from the bottom right to the upper left of the image. For each pixel, calculate $L_r^2(p, d)$ for the four directions;

Load $Sp_r^1(p,d_{min}^1), Sp_r^1(p,d_{min}^1 \pm 1), d_{min}^1$

Get $Sp_r^2(p,d_{min}^1) = Sp_r^1(p,d_{min}^1) + Sp_r^2(p,d_{min}^1)$, similar for $Sp_r^2(p,d_{min}^1 \pm 1)$;

Get minimum $S_r^2(p,d')$, do subpixel interpolation to get $d_{sub}'$, write out $S_r^2(p,d'), d_{sub}'$ Get $\min_i(L_r^2(p,i))$ and the corresponding $d_{min}^2$, write out $Sp_r^2(p,d_{min}^2), Sp_r^2(p,d_{min}^2 \pm 1), d_{min}^2$. (9)

FIG. 2I illustrates an SGM example in which an optional third pass is performed. The first and second passes may be the same as that described in relation to FIG. 2H. Then, after the first and second passes, at operation "E", path costs for L1-L4 are determined in the third pass and the sum of the third pass path costs is summed to yield winner candidates at operation "F". Then a winner selected from the third pass winner candidates is subjected to subpixel refinement to obtain a third pass winner disparity and winner cost. Then at operation "G", a final winner is selected based on the winner disparity and winner cost determined at the second pass and the winner disparity and winner cost determined at the third pass.

The third pass is performed from the upper left of the image to the bottom right. In the third pass, for each pixel, Load $Sp_r^2(p,d_{min}^2), Sp_r^2(p,d_{min}^2 \pm 1), d_{min}^2$ Load $S_r^2(p,d'), d_{sub}'$ Calculate $L_r^3(p,d_{min}^2)$ for the 4 directions, get the $Sp_r^3(p,d_{min}^2) = S_p^2(p,d_{min}^2) + Sp_r^3(p,d_{min}^2)$, similar $Sp_r^3(p,d_{min}^2 \pm 1)$ Get the minimum $S_r^3(p,d'')$, do subpixel interpolation to get $d_{sub}''$ if $S_r^3(p,d'') < S_r^2(p,d')$, output $S_r^3(p, d'')$ and $d_{sub}''$, else output $S_r^2(p,d'), d_{sub}'$ (10)

In some examples, the SGM block (e.g., the SGM block 208) implements an adaptive large penalty. The adaptive large penalty (adaptive P2) is implemented at least in some examples in the SGM block 208, the advantage of adaptive P2 is better preserving objects boundaries as well as thin objects.

The adaptive P2 implemented in hardware may be defined as follows in some examples based on current and previous images:

$$P2' = \frac{1}{\alpha}\text{abs}\,(I_{cur} - I_{pre}) + P2. \tag{11}$$

To simplify the implementation, the a may be limited to certain values (e.g., 1, 2, 4, and 8). In some examples, the SGM block 208 implements subpixel interpolation. The SGM block 208 may implement the equiangular subpixel interpolation, which yields a quality advantage compared to the well-known parabola interpolation. Equiangular subpixel interpolation can be determined as follows:

$$d_{SubPix} = \begin{cases} d_{Int} + \dfrac{c_{d+1} - c_{d-1}}{2 \times (c_d - c_{d-1})} & \text{if } c_{d+1} < c_{d-1} \\ d_{Int} + \dfrac{c_{d+1} - c_{d-1}}{2 \times (c_d - c_{d+1})} & \text{otherwise} \end{cases} \tag{12}$$

In equation (12), $c_d$ is the minimum path cost and $c_{d+1}$/$c_{d-1}$ are neighbor path costs, if any.

The OFA 202, in some examples, uses intermediate buffers for writing/reading temporary information that cannot store in on-chip memory. There are two kinds of intermediate buffers that may be used by the OFA 202: a history buffer and/or a temporary buffer. The history buffer is used to store path cost for (e.g., every) disparity/flow from a previous pixel row. The temporary buffer is used to store intermediate winner/cost from previous SGM pass.

Figure 2J:
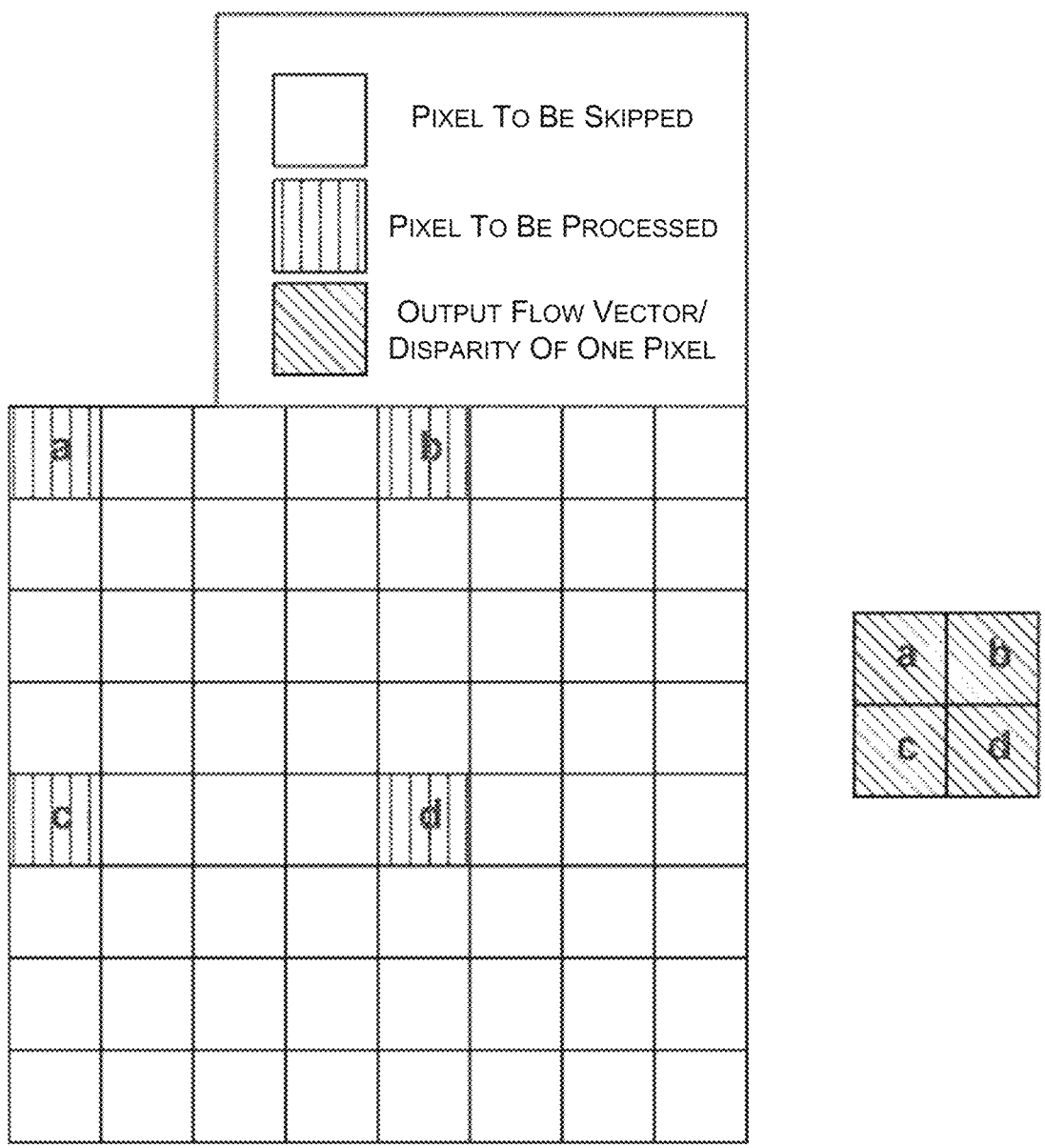
FIG. 2J is an example illustration of grid size features for an OFA, in accordance with some embodiments of the present disclosure.

The OFA 202, in some examples, supports variable motion vector/disparity output granularity. In some examples, the motion vector granularity and/or disparity output granularity is controlled through a grid size parameter. The grid size can be configured to ½/4/8 in x and y directions independently. That is, (grid size x)/(grid size y) can be variably configured (e.g., ½, 1, 2, etc.) by changing grid size x and grid size y independently of each other. FIG. 2J is an illustration of grid size feature in the OFA 202 for a grid size of 4×4, according to some examples. As shown in the figure, the output flow vector and or disparity for processing may be based upon a selected few of the pixels from the original pixels. The variable granularity feature allows for example embodiments to selectively bias quality and performance.

Referring back to FIG. 1, the process 100 may include the first processor(s) 102 outputting the vector data 106 representing a flow vector(s) for one or more (e.g., each) pixel locations represented by an image. The process 100 may then include the second processor(s) 108 processing the vector data 106 and tracked-feature data 110 in order to track a feature point(s) through the images represented by the image data 104. In some examples, the tracked-feature data 110 may represent at least an identifier(s) of a feature point(s) being tracked, a location(s) of the feature point(s) being tracked, and/or any other information associated with the feature point(s). In some examples, the location for a feature point may indicate at least a discrete pixel location or a subpixel location of the feature point(s) (e.g., such as by using a x-coordinate and a y-coordinate).

Figure 3A:
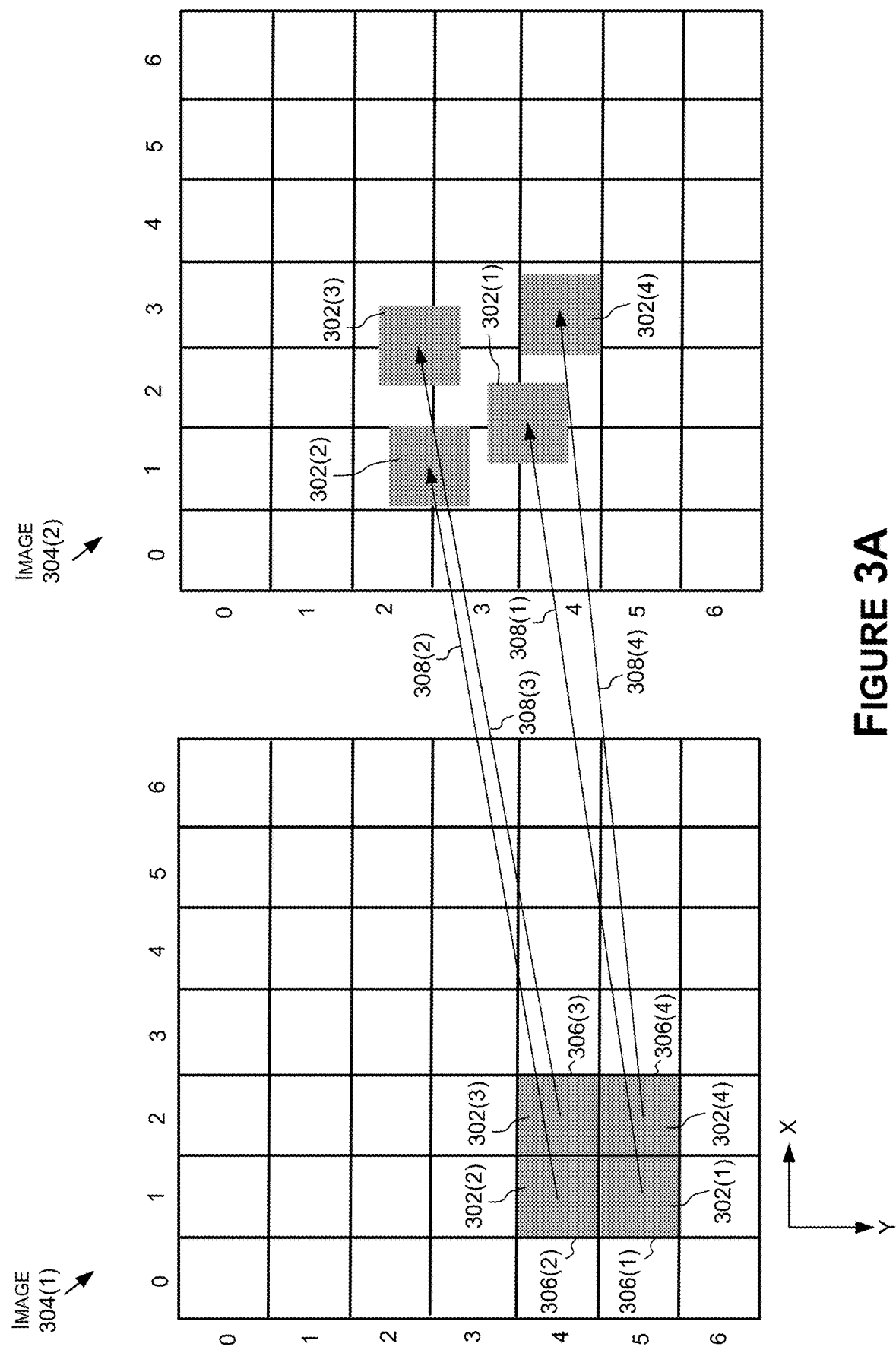
FIGS. 3A-3B illustrate an example of tracking a feature point through a sequence of images, in accordance with some examples of the present disclosure.
Figure 3B:
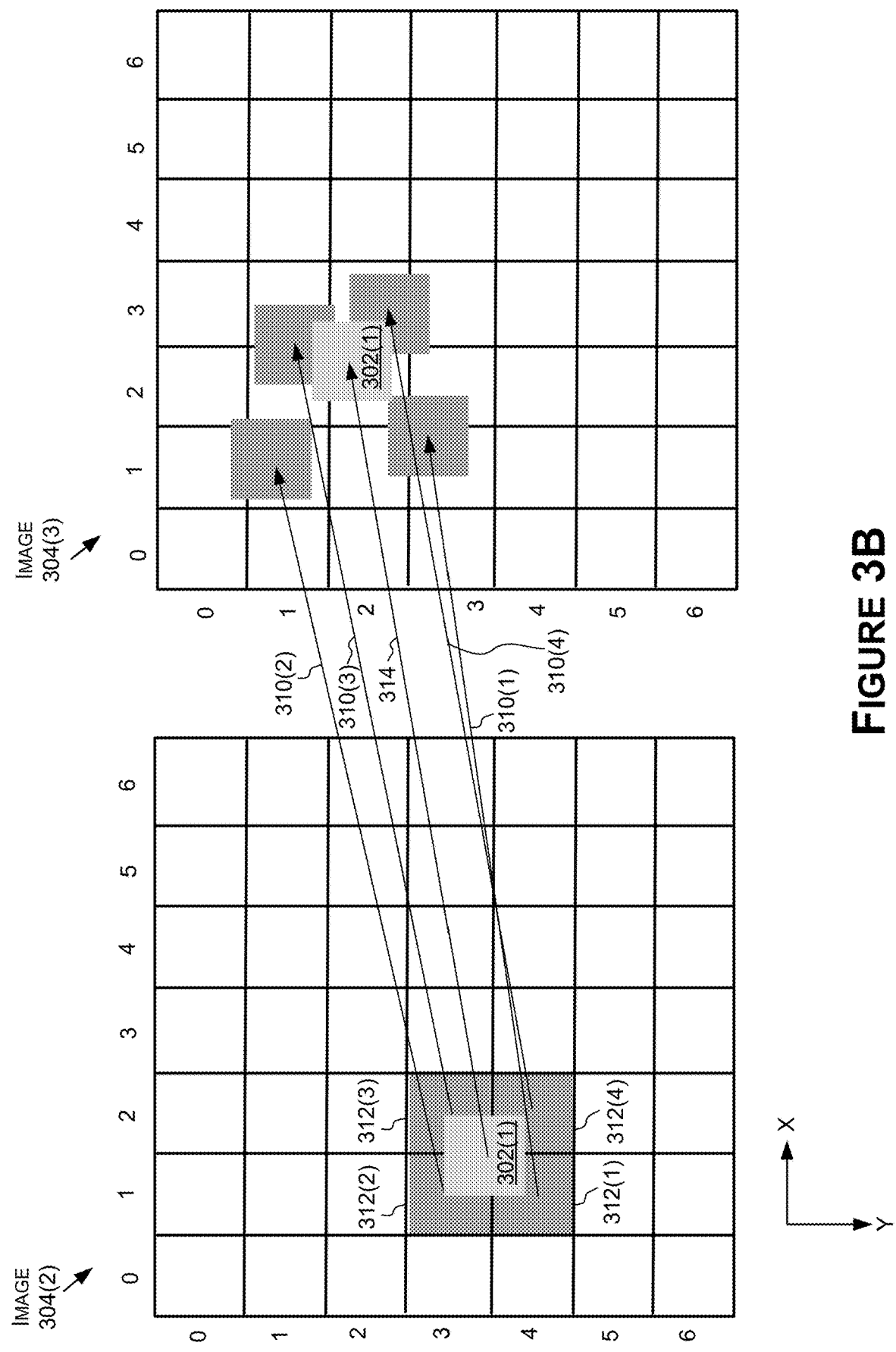

For instance, FIGS. 3A-3B illustrate an example of tracking one or more feature points through a sequence of images, in accordance with some examples of the present disclosure. As shown by the example of FIG. 3A, the second processor(s) 108 may track the locations of feature points 302(1)-(4) (also referred to singularly as "feature point 302" or in plural as "feature points 302") from a first image 304(1) represented by the image data 104 to a second image 304(2) represented by the image data 104. While the example of FIG. 3A illustrates the second processor(s) 108 as tracking the locations of four feature points 302 between the first image 304(1) and the second image 304(2), in other examples, the second processor(s) 108 may track the locations of any number of feature points 302. For example, the second processor(s) 108 may track the location of one feature point 302, the locations of ten feature points 302, the locations of every feature point 302, and/or the like from the first image 304(1) to the second image 304(2).

To track the locations of the feature points 302, and since each feature point 302 is located at a respective discrete pixel location 306(1)-(4) in the first image 304(1) (represented by the squares of the first image 304(1), where only the four discrete pixel locations 306(1)-(4) are labeled for clarity reasons), the second processor(s) 108 may process the vector data 106 in order to identify flow vectors 308(1)-(8) (also referred to singularly as "flow vector 308" or in plural as "flow vectors 308") for the pixel locations 306(1)-(4) associated with the first image 304(1). The second processor(s) 108 may then use the flow vectors 308 to track the locations of the feature points 302 from the first image 304(1) to the second image 304(2).

For instance, and for the feature point 302(1), the flow vector 308(1) associated with the pixel location 306(1) for which the feature point 302(1) is located may represent at least a displacement of the feature point 302(1) and, optionally, a starting position for the feature point 302(1). For example, the starting position may include the coordinates of the pixel location 306(1), which include (1, 5) in the example of FIG. 3A. The displacement for the feature point 302(1) may then include the change in location from the first image 304(1) to the second image 304(2). For instance, and in the example of FIG. 3A, the displacement coordinates may include (0.5, −1.4). This is because the feature point 302(1) moves 0.5 pixels in the x-direction and −1.4 pixels in the y-direction from the first image 304(1) to the second image 304(2). The second processor(s) 108 may then determine that the ending location of the feature point 302(1) in the second image 304(2) is associated with the coordinates (1.5, 3.6). Additionally, the second processor(s) 108 may perform similar processes for each of the other feature points 302.

As shown by the example of FIG. 3B, the second processor(s) 108 may then continue to track at least the location of feature point 302(1) (and/or similarly track the other locations of the other feature points 302) from the second image 304(2) to a third image 304(3) represented by the image data 104. To track the location of the feature point 302(1), the second processor(s) 108 may use similar processes as those described herein, at least with respect to FIG. 3A, in order to determine flow vectors 310(1)-(4) (also referred to singularly as "flow vector 310" or in plural as "flow vectors 310") for at least pixel locations 312(1)-(4) (also referred to singularly as "pixel location 312" or in plural as "pixel locations 312") associated with the subpixel location of the feature point 302(1). In some examples, the second processor(s) 108 may determine that the pixel locations 312 are associated with the subpixel location of the feature point 302(1) based on the subpixel location of the feature point 302(1) at least partially overlapping each of pixel location 312.

As described herein, the flow vectors 310 may indicate the starting locations, the displacements, and/or the ending locations associated with the pixel locations 312. For instance, the flow vector 310(1) associated with the pixel location 312(1) may include a starting location of coordinates (1, 4), a displacement of coordinates (0.4, −1.2), and/or an ending location of coordinates (1.4, 2.8), the flow vector 310(2) associated with the pixel location 312(2) may include a starting location of coordinates (1, 3), a displacement of coordinates (0.1, −2.1), and/or an ending location of coordinates (1.1, 0.9), the flow vector 310(3) associated with the pixel location 312(3) may include a starting location of coordinates (2, 3), a displacement of coordinates (0.6, −1.9), and/or an ending location of coordinates (2.6, 1.1), and the flow vector 310(4) associated with the pixel location 312(4) may include a starting location of coordinates (2, 4), a displacement of coordinates (0.9, −1.8), and/or an ending location of coordinates (2.9, 2.2). The second processor(s) 108 may then use the flow vectors 312 to determine the ending location of the feature point 302(1) in the third image 304(3).

In some examples, the second processor(s) 108 may use the pixel locations 312, the location of the subpixel associated with the feature point 302(1) in the second image 304(2), and/or the flow vectors 312 to determine a flow vector 314 associated with the feature point 302(1). For example, the second processor(s) 108 may use interpolation to determine the flow vector 314 for the feature point 302(1) based on the pixel locations 312, the location of the subpixel associated with the feature point 302(1) in the second image 304(2), and/or the flow vectors 312. The interpolation may include, but is not limited to, linear interpolation, bilinear interpolation, and/or any other type of interpolation. The second processor(s) 108 may then use the flow vector 314 to determine the ending location of the feature point 302(1) in the third image 304(3). For example, if the starting location (e.g., as indicated by the tracked-feature data 108) for the feature point 302(1) is at coordinates (1.5, 3.6) and the flow vector 314 indicates a displacement of coordinates (0.8, −1.8), then the ending location for the feature point 302(1) may include coordinates (2.3, 1.8).

For an example of performing a subpixel flow calculation, the second processor(s) 108 may initially round a start location to an integer, eidx_old, where the 2D array (x,y) coordinates of a cell indicate the start position of the optical flow. In some examples, one or more cells (e.g., each cell) in the array contains two elements. The two elements describe the x and y displacement vector originating from the cell:

$$gg\_old00 = np.\text{floor}(eidx_{old}).\text{astype}(int) \quad (13)$$

$$gg\_old11 = np.\text{floor}(eidx_{old}).\text{astype}(int) \quad (14)$$

In the above, equation (13) is associated with the pixel location 312(2) and equation (14) is associated with the pixel location 312(4).

The second processor(s) 108 may then calculate the fractional part of the start location (e.g., the subpixel) for the feature point 302(1) for the cells. In some examples, each element in the array indicates the fractional part of the displacement vector in the x and y directions. For instance, the fractional part for a pixel cell may include:

$$frac11 = np.\text{mod}(eid\_old) \quad (15)$$

The second processor(s) 108 may then reorder the gg_old00, gg_old11 arrays from (M,N,2) to vectors (2*M*N, 1) by:

$$gg\_old01 = np.\text{vstack}\{(gg\_old00[:,0], gg\_old11[:,1])\}.T \quad (17)$$

$$gg\_old10 = np.\text{vstack}\{(gg\_old11[:,0], gg\_old00[:,1])\}.T \quad (18)$$

The second processor(s) 108 may then create four lists of indices for the starting pixel locations 312, which the second processor(s) 108 may then use to interpolate the flow vector 314 for the subpixel location of the feature point 302(1). For instance, the list of indices may include:

$$eidx00 = eidx[gg\_old00[:,1], gg\_old00[:,0],:] \quad (19)$$

$$eidx01 = eidx[gg\_old01[:,1], gg\_old01[:,0],:] \quad (20)$$

$$eidx10 = eidx[gg\_old10[:,1], gg\_old10[:,0],:] \quad (21)$$

$$eidx11 = eidx[gg\_old11[:,1], gg\_old11[:,0],:] \quad (22)$$

In the above, equation (19) is associated with the pixel location 312(2) and/or the flow vector 310(2), equation (20) is associated with the pixel location 312(3) and/or the flow vector 310(3), equation (21) is associated with the pixel location 312(1) and/or the flow vector 310(1), and equation (22) is associated with the pixel location 312(4) and/or the flow vector 310(4).

The second processor(s) 108 may then calculate three fraction vectors to be used for interpolation (e.g., bilinear interpolation) in order to have four vectors describing the fractional part. For instance, the three other fractional vectors may include:

$$frac00 = np.\text{vstack}((1-frac11[:,0], 1-frac11[:,1])).T \quad (23)$$

$$frac01 = np.\text{vstack}((1-frac11[:,0], frac11[:,1])).T \quad (24)$$

$$frac00 = np.\text{vstack}((frac11[:,0], 1-frac11[:,1])).T \quad (25)$$

The second processor(s) 108 may then ensure that the four displacement vectors are valid. Certain displacement vectors may have been labeled invalid by processor 102, or processor(s) 108 may determine that one or more displacement vectors are invalid if, for example, their endpoints fall outside the boundaries of image 304(3). Other criteria for determining validity can be used by processor(s) 108.

The second processor(s) 108 may then ensure that the four displacement vectors are consistent with one another. As described herein, the displacement vectors may be invalid if the displacement vectors are not consistent with one another. Valid displacement vectors at locations 00 01, 10, and 11 (four neighbors of a track) are referred to below using an array of variables—nz00, nz01, nz10, and nz11. For example, the second processor(s) 108 may determine that the four displacement vectors are consistent with one another by the following:

$$cst\_chk = np.\text{stack}((eidx00, eidx01, eidx10, eidx11) \\ \text{axis}=2) \quad (26)$$

$$std\_chk = sct\_chk.\text{std}(\text{axis}=2) \quad (27)$$

$$std\_msk = np.\text{any}(std\_chk < 0.7, \text{axis}=1) \quad (28)$$

The second processor(s) 108 may then determine the flow vector 314 using the flow vectors 310. For instance, the second processor(s) 108 may calculate the flow vector 314 by the following:

$$nz = nz00 * nz01 * nz10 * nz11 * std\_msk \quad (29)$$

$$nz_{idx} = np.\text{nonzero}(nz) \quad (30)$$

As described herein, the second processor(s) 108 may determine the fractional vectors that are then used to determine the flow vector 314 for the feature point 302(1). In some examples, and as illustrated in FIG. 1, the second processor(s) 108 may include a hardware unit that stores a lookup table 112 that the second processor(s) 108 use to determine the fractional vectors. For instance, the second processor(s) 108, which may know the location of the subpixel associated with the feature point 302(1) in the second image 304(3) (e.g., such as to a certain number of bits), may use a fractional part of the location to derive filtering coefficients. For instance, the second processor(s) 108 may use the location of the subpixel and the lookup table 112 to determine the fractioning filtering coefficients for the pixel locations 312. The second processor(s) 108 may then use the fractioning filtering coefficients to perform the interpolation described herein (e.g., to determine fractional parts of the subpixel location for the fractional vectors).

Additionally, as described with respect to the example of FIG. 3B, in some examples, the second processor(s) 108 may verify that the flow vectors are consistent with one another and/or that the flow vectors are valid. In some examples, if the second processor(s) 108 determines that the flow vectors are not consistent with one another and/or that at least one of the flow vectors is invalid, then the second processor(s) 108 may terminate the track associated with the feature point 302(1). For instance, FIGS. 4A-4B illustrate examples of terminating a track associated with the feature point 302(1), in accordance with some examples of the present disclosure.

Figure 4A:
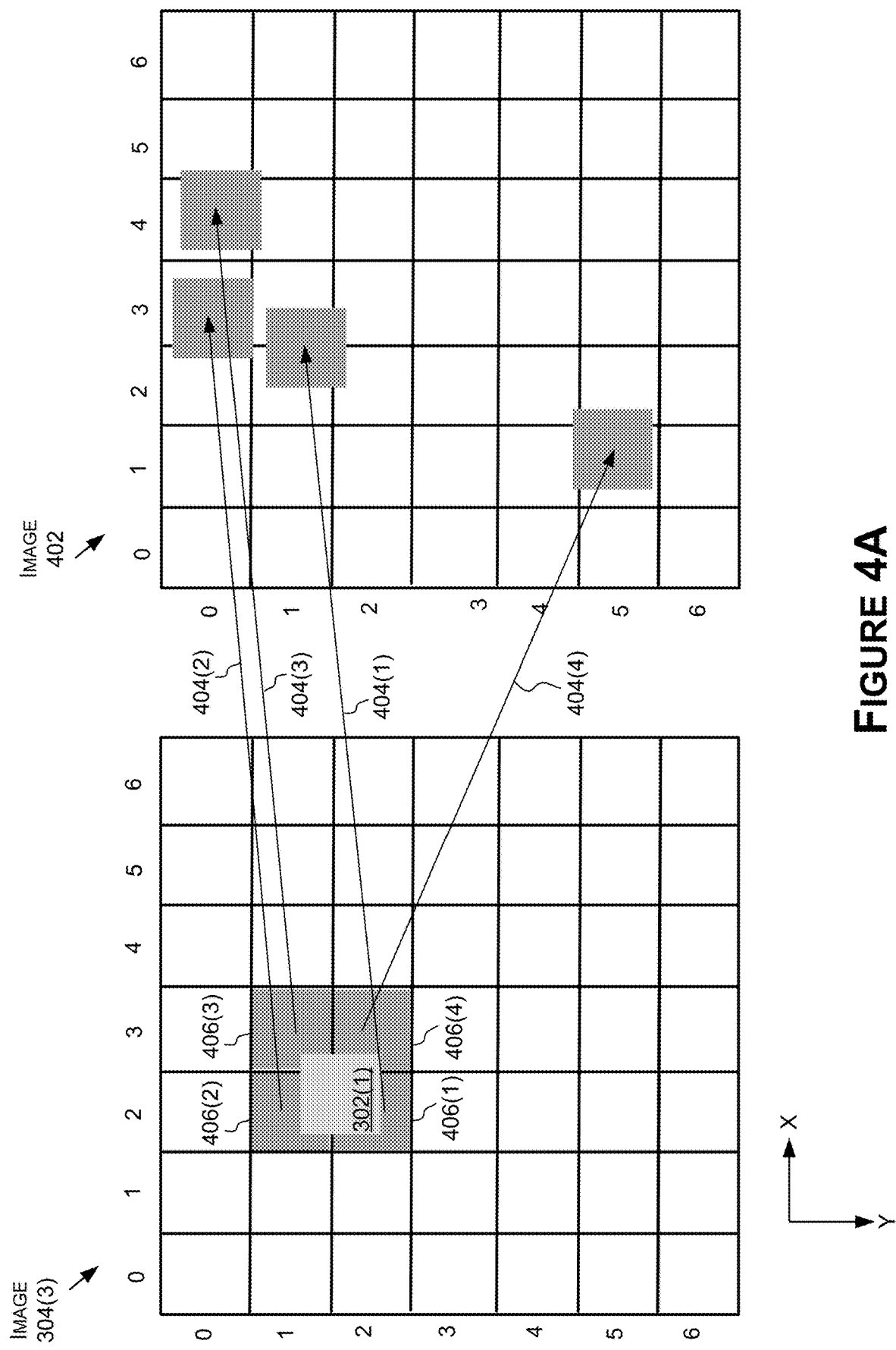
FIGS. 4A-4B illustrate examples of terminating a track associated with a feature point, in accordance with some examples of the present disclosure.
Figure 4B:
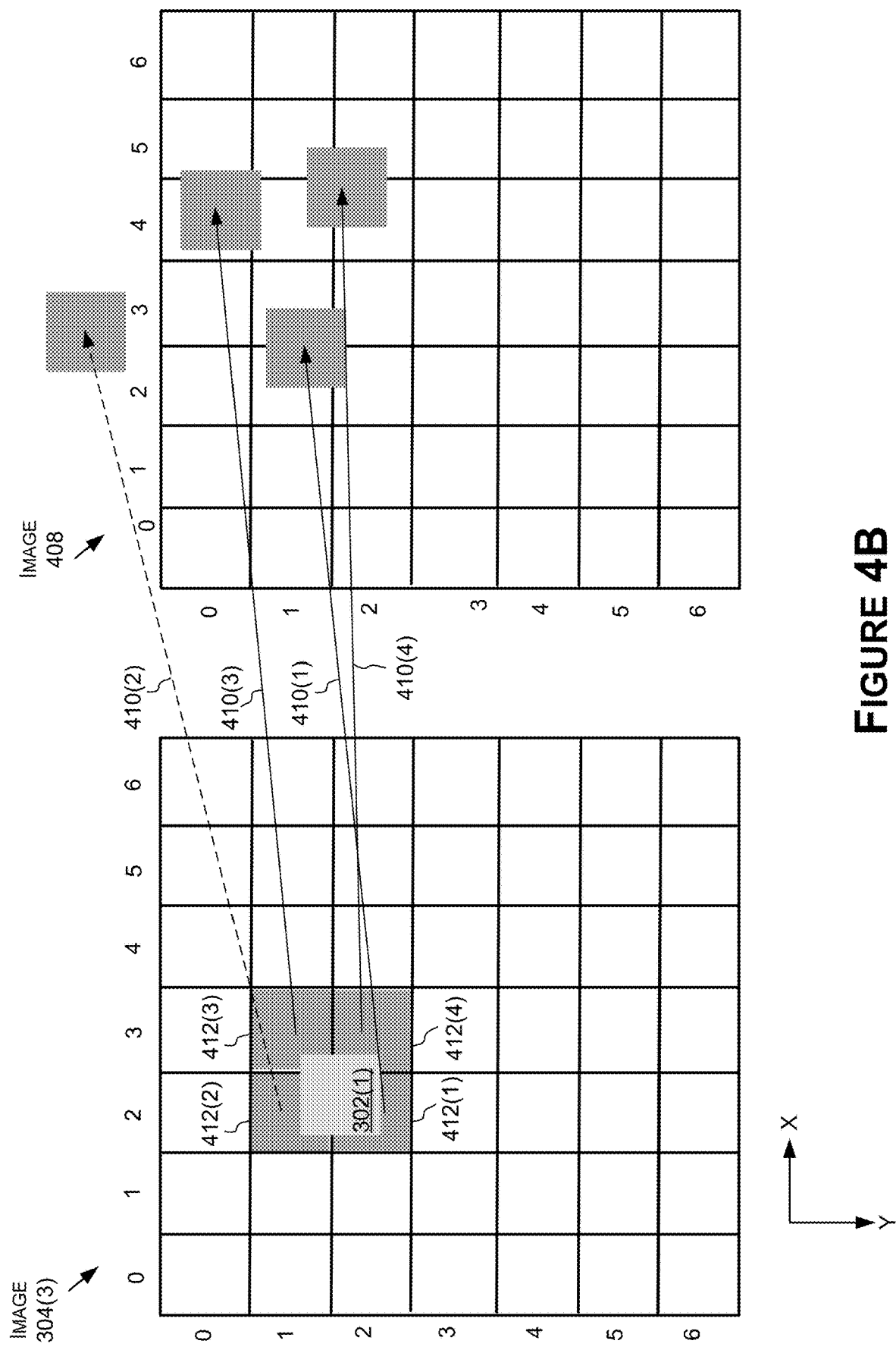

As shown by the example of FIG. 4A, the second processor(s) 108 may continue to track at least the location of the feature point 302(1) (and/or similarly track the other locations of the other feature points 302) from the third image 304(3) to a fourth image 402 represented by the image data 104. To track the location of the feature point 302(1), the second processor(s) 108 may use similar processes as those described herein at least with respect to FIGS. 3A-3B in order to determine flow vectors 404(1)-(4) (also referred to singularly as "flow vector 404" or in plural as "flow vectors 404") for at least pixel locations 406(1)-(4) (also referred to singularly as "pixel location 406" or in plural as "pixel locations 406") associated with the subpixel location of the feature point 302(1) in the third image 304(3). In some examples, the second processor(s) 108 may determine that the pixel locations 406 are associated with the subpixel location of the feature point 302(1) based on the subpixel location of the feature point 302(1) at least partially overlapping each of the pixel locations 406.

As described herein, the flow vectors 404 may indicate the starting locations, the displacements, and/or the ending locations associated with pixel locations 406. For instance, the flow vector 404(1) associated with the pixel location 406(1) may include a starting location of coordinates (2, 2), a displacement of coordinates (0.5, −0.8), and/or an ending location of coordinates (2.5, 1.2), the flow vector 404(2) associated with the pixel location 406(2) may include a starting location of coordinates (2, 1), a displacement of coordinates (0.9, −0.8), and/or an ending location of coordinates (2.9, 0.2), the flow vector 404(3) associated with the pixel location 406(3) may include a starting location of coordinates (3, 1), a displacement of coordinates (1.1, −0.7), and/or an ending location of coordinates (4.1, 0.3), and the flow vector 404(4) associated with the pixel location 406(4) may include a starting location of coordinates (3,2), a displacement of coordinates (−.1.7, 2.9), and/or an ending location of coordinates (1.3, 4.9).

The second processor(s) 108 may then determine to terminate the track associated with the feature point 302(1) based on the flow vectors 404. In some examples, the second processor(s) 108 may determine to terminate the track based on the ending location associated with the pixel location 406(4) being outside of a threshold distance (e.g., one pixel, two pixels, three pixels, etc.) from one or more of the ending locations associated with one or more of the pixel locations 406(1)-(3). In some examples, the second processor(s) 108 may determine to terminate the track based on the flow vector 404(4) moving in one more different directions (e.g., in the x-direction, in the y-direction, etc.) than one or more of the flow vectors 404(1)-(3). Still, in some examples, the second processor(s) 108 may determine to terminate the track based on a standard deviation associated with the flow vectors 404 (e.g., a standard deviation associated with the displacements of the flow vectors 404, a standard deviation associated with the ending locations of the flow vectors 404, etc.) not satisfying (e.g., being equal to or greater than) a threshold standard deviation. The threshold standard deviation may include, but is not limited to, 0.5, 0.7, 0.8, 0.9, and/or any other value.

For another example of terminating the track associated with the feature point 302(1), and as shown by the example of FIG. 4B, the second processor(s) 108 may again continue to track at least the location of feature point 302(1) (and/or similarly track the other locations of the other feature points 302) from the third image 304(3) to a fourth image 408 represented by the image data 104. To track the location of the feature point 302(1), the second processor(s) 108 may use similar processes as those described herein with at least respect to FIGS. 3A-3B in order to determine flow vectors 410(1)-(4) (also referred to singularly as "flow vector 410" or in plural as "flow vectors 410") for at least pixel locations 4102(1)-(4) (also referred to singularly as "pixel location 412" or in plural as "pixel locations 412") associated with the subpixel location of the feature point 302(1) in the third image 304(3). In some examples, the second processor(s) 108 may determine that the pixel locations 412 are associated with the subpixel location of the feature point 302(1) based on the subpixel location of the feature point 302(1) at least partially overlapping each of the pixel locations 412.

As described herein, the flow vectors 410 may indicate the starting locations, the displacements, and/or the ending locations associated with pixel locations 412. For instance, the flow vector 410(1) associated with the pixel location 412(1) may include a starting location of coordinates (2, 2), a displacement of coordinates (0.5, −0.8), and/or an ending location of coordinates (2.5, 1.2), the flow vector 410(3) associated with the pixel location 412(3) may include a starting location of coordinates (3, 1), a displacement of coordinates (1.1, −0.7), and/or an ending location of coordinates (4.1, 0.3), and the flow vector 410(4) associated with the pixel location 412(4) may include a starting location of coordinates (3, 2), a displacement of coordinates (1.4, −0.3), and/or an ending location of coordinates (4.4, 1.7). However, since a feature point associated with the pixel location 412(2) is not depicted by the image 408, the second processor(s) 108 may determine that the flow vector 410(2) is invalid (which is illustrated by the dashed line). As described herein, in some examples, the second processor(s) 108 may terminate the track associated with the feature point 302(1) based on the flow vector 410(2) being invalid.

Figure 5:
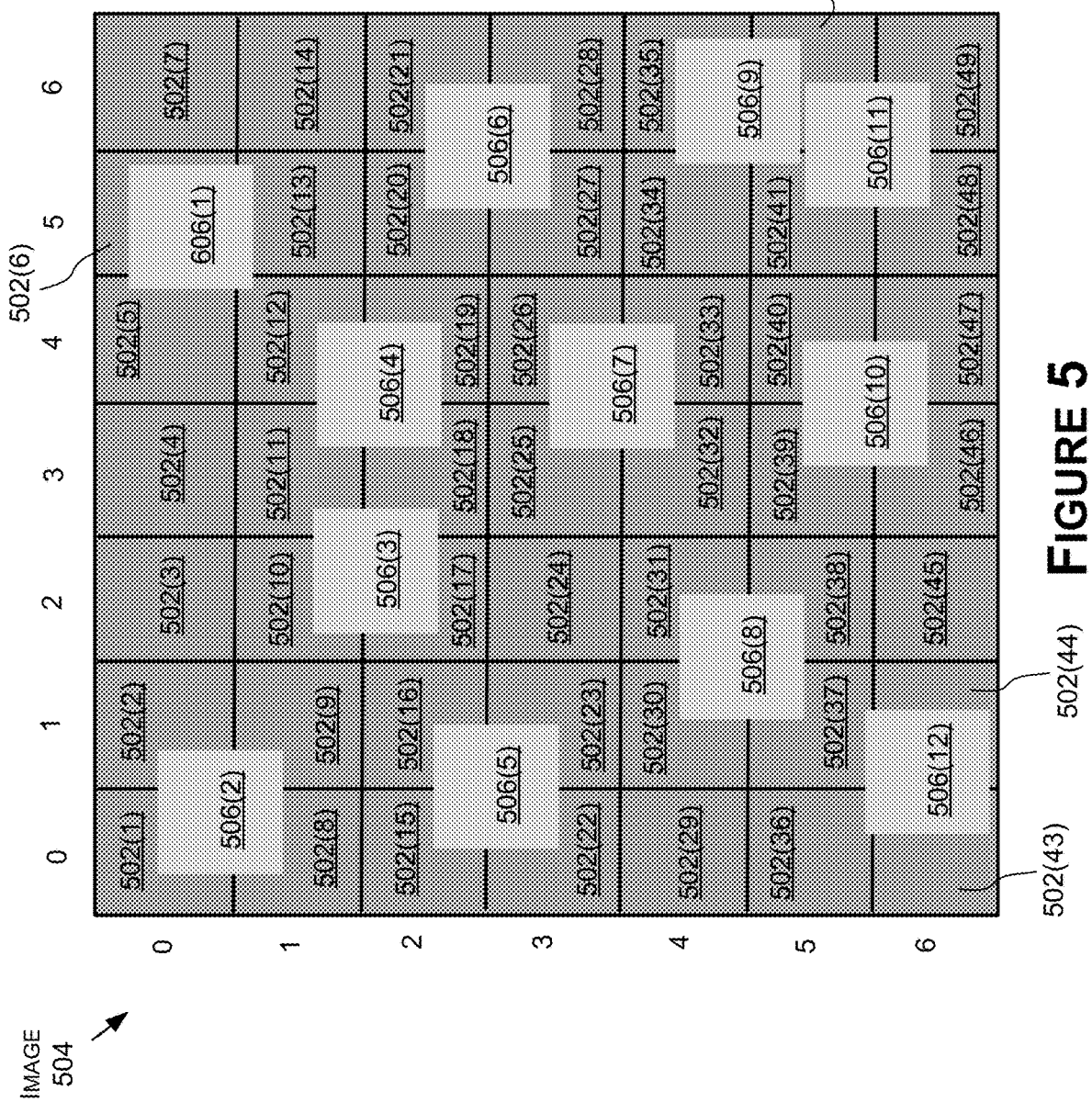
FIG. 5 illustrates an example of creating a new track for a feature point, in accordance with some examples of the present disclosure.

In some examples, in addition to terminating tracks for feature points, the second processor(s) 108 may also generate new tracks for feature points. For instance, FIG. 5 illustrates an example of generating a new track(s) for a feature point(s), in accordance with some embodiments of the present disclosure. In the example of FIG. 5, the second processor(s) 108 may receive vector data 106 representing the flow vectors associated with pixel locations 502(1)-(49) (also referred to singularly as "pixel location 502" or in plural as "pixel locations 502") of an image 504. While the example of FIG. 5 describes the vector data 106 as representing flow vectors for each of the pixel locations 502 of the image 504, in other examples, the vector data 106 may represent a flow vector(s) for one or more of the vector locations 502.

The second processor(s) 108 may also receive tracked-feature data 110 representing at least identifiers of feature points 506(1)-(12) (also referred to singularly as "feature point 506" or in plural as "feature points 506") being tracked, locations (e.g., subpixel locations) of the feature points 506, and/or any other information associated with the feature points 506. The second processor(s) 108 may then use the vector data 106 and the tracked-feature data 110 to determine new tracks for one or more feature points associated with one or more of the pixel locations 502.

In some examples, the second processor(s) 108 may determine to generate a new track for a feature point when the pixel location 502 associated with the feature point is not used by an existing feature point 506 and/or when the flow vector associated with the pixel location 502 is not valid. For instance, and using the example of FIG. 5, the second processor(s) 108 may determine not to generate a new track for a feature point associated with the pixel location 502(1) based on the pixel location 502(1) already being used to track the feature point 506(2) (e.g., the subpixel location associated with the feature point 506(2) partially overlaps with the pixel location 502(1)). Additionally, the second processor(s) 108 may determine to generate a new track for a feature point associated with the pixel location 502(3) based on the pixel location 502(3) not being used by any of the tracks of the feature points 506 and/or the flow vector associated with the pixel location 502(3) not being valid. While these are just a couple example techniques for how the second processor(s) 108 may generate new tracks for feature points, in other examples, the second processor(s) 108 may use one or more additional and/or alternative techniques to generate new tracks for feature points.

Referring back to the example of FIG. 1, the second processor(s) 108 may generate and output tracking data 114 associated with the tracked feature point(s). As shown, the tracking data 114 may include identifier data 116, location data 118, and/or other data 120. In some examples, the identifier data 116 may represent an identifier(s) for a feature point(s) being tracked. As described herein, an identifier for a feature point may include, but is not limited to, an alphabetic identifier, a numerical identifier, an alphanumeric identifier, and/or any other type of identifier that may be used to identify the feature point. The location data 118 may represent a location(s) of the feature point(s). In some examples, the location data 118 for a feature point may represent coordinates, such as an x-coordinate and a y-coordinate, of the location of the feature point. In some examples, the location data 118 may represent a vector, such as a flow vector (e.g., a last flow vector) associated with the feature point, where the vector indicates the location of the feature point. Additionally, the other data 120 may represent an identifier(s) of a feature point(s) for which a track(s) was generated, an identifier(s) of a feature point(s) for which a track(s) was terminated, and/or any other information associated with the feature point(s).

In some examples, the tracked-feature data 110 may include at least a portion of the tracking data 114. For example, and as described herein, the tracked-feature data 110 may include at least the identifier data 116 and the location data 118.

In some examples, the tracking data 114 may further be associated with a "book-keeping" operation that is performed in order to track the feature point(s). For instance, if a detection of a feature point is an initial detection, then the second processor(s) 108 may initialize a new record for the feature point and assign the feature point with an identifier (which may be represented by the identifier data 116). The second processor(s) 108 may then continue to update the track associated with the feature point as the second processor(s) 108 continues to track the feature point through one or more images (e.g., one or more frames). For example, the second processor(s) 108 may update the track to include an identifier (e.g., a frame number) of the first frame for which the feature point was detected, an identifier (e.g., a last number) of the last frame for which the feature point was detected (e.g., before termination), the two-dimensional location(s) (e.g., x-position, y-position) of the feature point in one or more frames (e.g., each frame) for which the feature point was detected, the three-dimensional location(s) (e.g., x-position, y-position, z-position) of the feature point determined using the one or more frames (e.g., for each frame for which the feature point is detected), a color (e.g., the RGB color) associated with the feature point, and a projection error(s) for one or more frames (e.g., each frame) for which the feature point is detected. In some examples, the projection error for a frame is the difference between the two-dimensional location of the feature point for the frame and a reprojection of the feature point on the frame using the three-dimensional location.

In some examples, the second processor(s) 108 may update the information associated with the track each time that the second processor(s) 108 detects the feature point in a frame. In some examples, the second processor(s) may update the information associated with the track for every other frame, every fourth frame, every tenth frame, and/or the like that the second processor(s) 108 detect the feature point.

In some examples, the first processor(s) 102 and/or the second processor(s) 108 may perform one or more processes in order to verify a track(s) of a feature point(s). For instance, and as shown in FIG. 1, the first processor(s) 102 may receive at least a portion of the tracking data 114. The first processor(s) 102 may then use the at least the portion of the tracking data 114 to determine a flow vector(s) for a pixel location(s) in an image, where the flow vector(s) represents motion between the image and a previous image. The second processor(s) 108 may then receive vector data 106 representing the flow vector(s) and perform one or more of the processes described herein to determine a location of a feature point in the previous image using a flow vector(s) for a pixel location(s) associated with the feature point and a subpixel location of the feature point in the image. The second processor(s) may then verify the track of the feature point between the previous image and the image when the determined location of the feature point in the previous image corresponds to the known location of the feature point in the previous image. In some examples, a determined location may correspond to a known location when the determined location matches the known location. In some examples, a determined location may correspond to a known location when the determined location is within a threshold distance (e.g., one pixel, two pixels, three pixels, etc.) to the known location.

Figure 6:
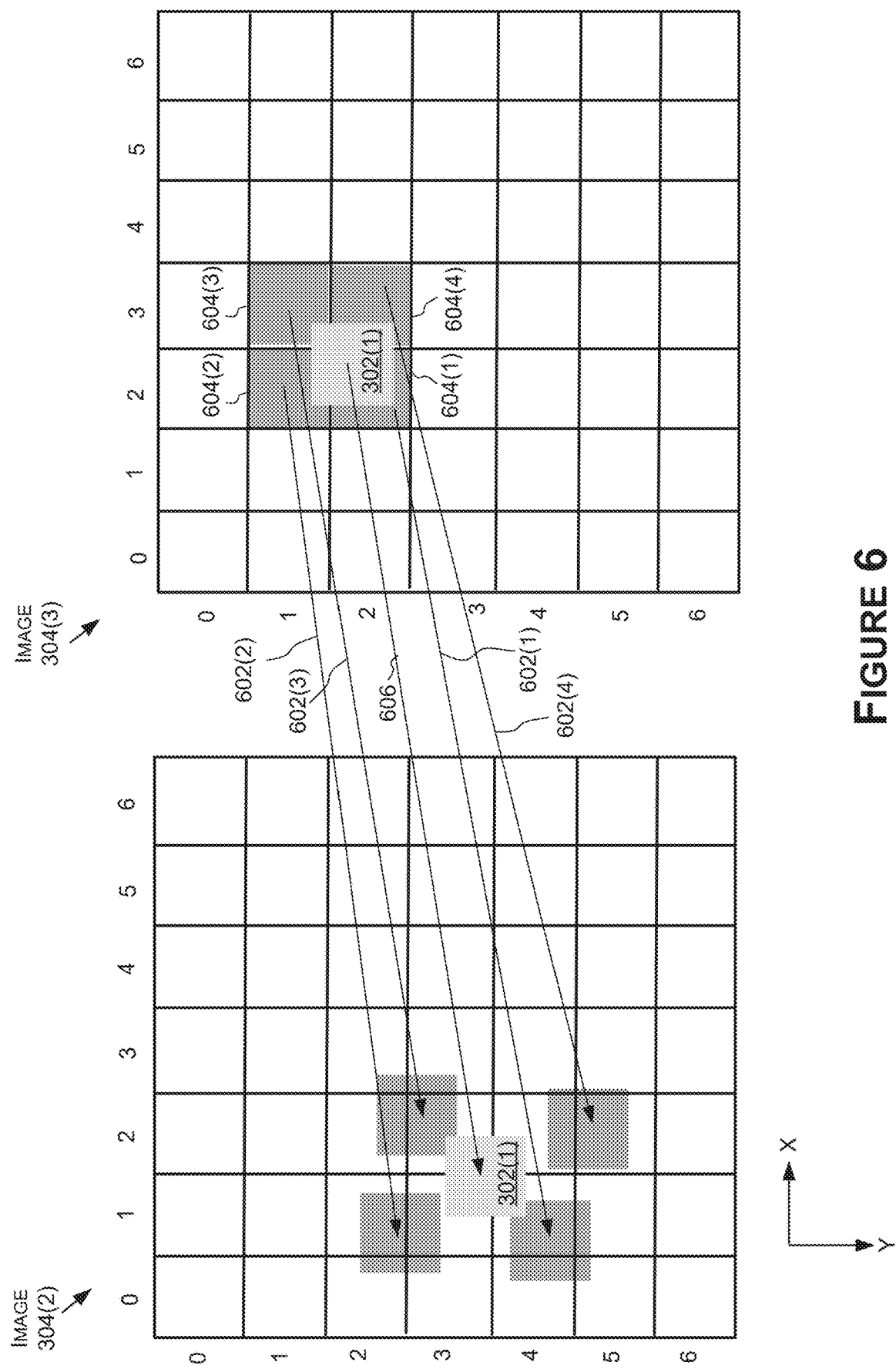
FIG. 6 illustrates an example of verifying a track between images, in accordance with some examples of the present disclosure.

For instance, FIG. 6 illustrates an example of verifying the track of the feature point 302(1) between the second image 304(2) and the third image 304(3) as described with respect to the example of FIG. 3B, in accordance with some embodiments of the present disclosure. As shown, the first processor(s) 102 may have processed the third image 304(3) and the second image 304(2) using one or more of the processes described herein, but in reverse, to determine flow vectors 602(1)-(4) (also referred to singularly as "flow vector 602" or in plural as "flow vectors 602") for at least pixel locations 604(1)-(4) (also referred to singularly as "pixel location 604" or in plural as "pixel locations 604") of the third image 304(3). The second processor(s) 108 may then use vector data 106 representing at least the flow vectors 602 and tracked-feature data 110 (and/or the tracking data 114) representing at least the location of the feature point 302(1) in the third image 304(3) to verify the track of the feature point 302(1) between the second image 304(2) and the third image 304(3) (e.g., verify that the location of the feature point 302(1) in the third image 304(3) is correct).

For instance, the second processor(s) 108 may perform one or more of the processes described herein to determine the location of the feature point 302(1) within the second image 304(2) using at least the location of the feature point 302(1) within the third image 304(3) and the flow vectors 602. For example, the second processor(s) 108 may use the flow vectors 602 to determine a flow vector 606 associated with the feature point 302(1) (e.g., such as by using interpolation). The second processor(s) 108 may then use the location of the feature point 302(1) within the third image 304(3) and the flow vector 606 to determine the location of the feature point 302(1) within the second image 304(2). The second processor(s) 108 may then use the determined location of the feature point 302(1) in the second image 304(2) and the known location of the feature point 302(1) in the second image 304(2) to verify whether the track for the feature point 302(1) between the second image 304(2) and the third image 304(3) is correct.

For instance, and in some examples, the second processor(s) 108 may verify the track of the feature point 302(1) from the second image 304(2) to the third image 304(3) based on the determined location of the feature point 302(1) matching the known location of the feature point 302(1). In some examples, the second processor(s) 108 may verify the track of the feature point 302(1) from the second image 304(2) to the third image 304(3) based on the determined location of the feature point 302(1) being within a threshold distance to the known location of the feature point 302(1). In either of these examples, if the second processor(s) 108 verifies the track of the feature point 302(1), then the second processor(s) 108 may continue to track the feature point 302(1) through additional images. However, in some examples, if the second processor(s) 108 cannot verify the track of the feature point 302(1) (e.g., the determined location does not match the known location, the determined location is outside of the threshold distance from the known location, etc.), then the second processor(s) 108 may terminate the track of the feature point 302(1).

Referring back to FIG. 1, in some examples, and as illustrated in the example of FIG. 1, the first processor(s) 102 may be separate from the second processor(s) 108. For instance, and as described herein, the first processor(s) 102 may be configured to perform a first part of the processing, such as the processing of the image data 104 to generate the vector data 106, and the second processor(s) 108 may be configured to perform a second part of the processing, such as processing the vector data 106 and the tracked-feature data 110 to track a feature point(s). In such examples, the first processor(s) 102 may include a first accelerator(s) (e.g., an OFA(s), etc.) and the second processor(s) 108 may include a second accelerator(s) (e.g., a programmable vision accelerator(s) (PVA(s)), etc.). Where a PVA is used, the PVA may include one or more vector processing units (VPUs) and/or one or more direct memory access (DMA) systems. In some examples, the second processor(s) may include a VPU(s) and/or a DMA system(s), or may include additional or alternative components.

In other examples, and as also illustrated by the example of FIG. 1, the first processor(s) 102 and the second processor(s) 108 may include a single processor(s) 122 that performs the processing described herein to track the feature point(s). For example, the processor(s) 122 may include an accelerator(s) (e.g., an OFA(s)) that is configured to process the image data 104 to generate the vector data 106 and then process the vector data 106 and the tracked-feature data 110 to track a feature point(s). In such examples, additional hardware may be added to the processor(s) 122. For instance, if the processor(s) 122 is an OFA, at least the hardware unit that stores the lookup table 112 may be added to the OFA. This way, the OFA is further able to perform the processes of the second processor(s) 108 in order to determine the current tracking vector(s) associated with the tracked feature point(s) (e.g., using one or more of the processes described herein).

Figure 7:
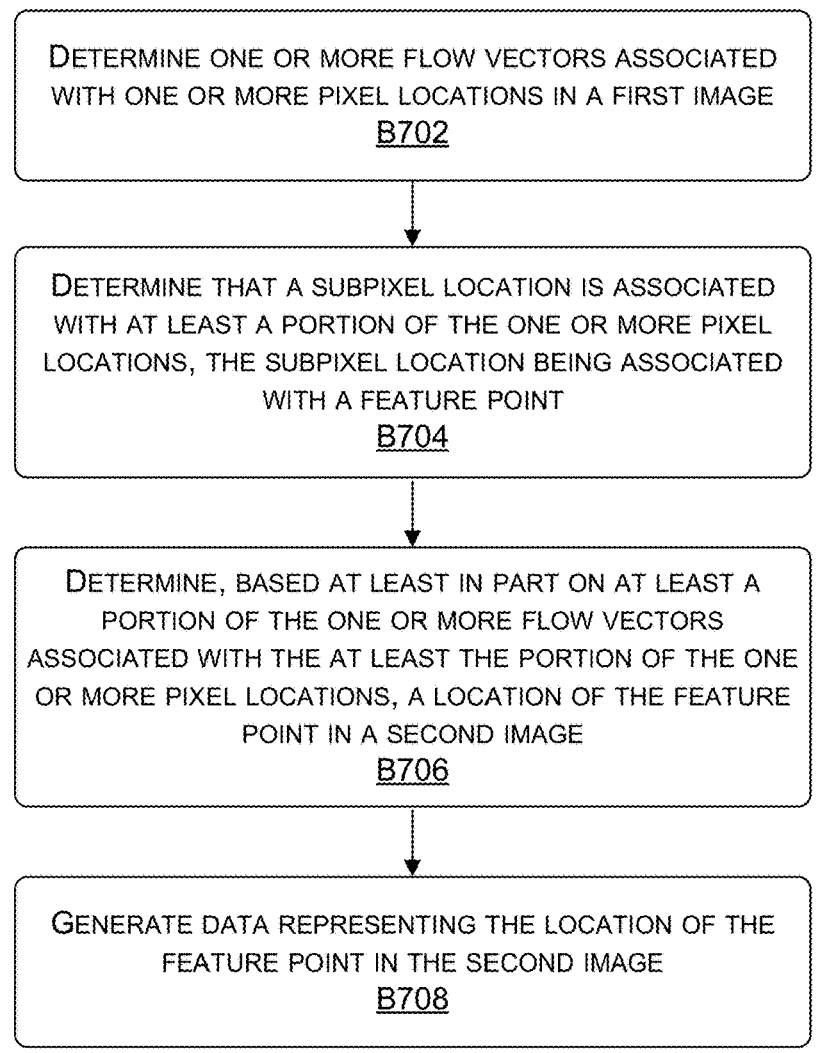
FIG. 7 is a flow diagram showing a method for using hardware to track a feature point between images, in accordance with some embodiments of the present disclosure.

Now referring to FIG. 7, each block of method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, the method 700 is described, by way of example, with respect to FIG. 1. However, the method 700 may additionally or alternatively be executed by any one system, or any combination of systems, including, but not limited to, those described herein.

FIG. 7 is a flow diagram showing a method 700 for using hardware to track a feature point between images, in accordance with some embodiments of the present disclosure. The method 700, at block B702, includes determining one or more flow vectors associated with one or more pixel locations in a first image. For instance, the first processor(s) 102 may process the image data 104. Based on the processing, the first processor(s) 102 may determine the one or more flow vectors (e.g., multiple flow vectors) associated with the one or more pixel locations (e.g., each pixel location) of the first image. As described herein, a flow vector associated with a pixel location may represent a starting position of the pixel location in the first image, a displacement associated with the pixel location, and/or an ending location associated with the pixel location in a second image.

The method 700, at block B704, may include determining that a subpixel location is associated with at least a portion of the one or more pixel locations, the subpixel location being associated with a feature point. For instance, the second processor(s) 108 may determine that the subpixel location is associated with the at least the portion of the one or more pixel locations. In some examples, the second processor(s) 108 may make the determination based on the subpixel location at least partially overlapping with the at least the portion of the pixel locations. In some examples, the second processor(s) may make the determination using tracked-feature data 110, where the tracked-feature data 110 represents at least the subpixel location in the first image.

The method 700, at block B706, may include determining, based at least in part on at least a portion of the one or more flow vectors associated with the at least the portion of the one or more pixel locations, a location of the feature point in a second image. For instance, the second processor(s) 108 may use the at least the portion of the one or more flow vectors associated with the at least the portion of the one or more pixel locations to determine the location of the feature point in the second image. In some examples, to make the determination, the second processor(s) 108 may process the at least the portion of the one or more pixel locations, the at least the portion of the flow vectors, one or more ending locations associated with the at least the portion of the pixel locations, and/or the subpixel location using interpolation. Based on the processing, the second processor(s) 108 may determine a flow vector associated with the subpixel location. The second processor(s) 108 may then use the flow vector and the subpixel location to determine the location of the feature point in the second image.

The method 700, at block B708, may include generating data representing the location of the feature point in the second image. For instance, the second processor(s) 108 may generate tracking data 114 representing at least an identifier associated with the feature point and the location of the feature point in the second image.

Example Autonomous Vehicle

Figure 8A:
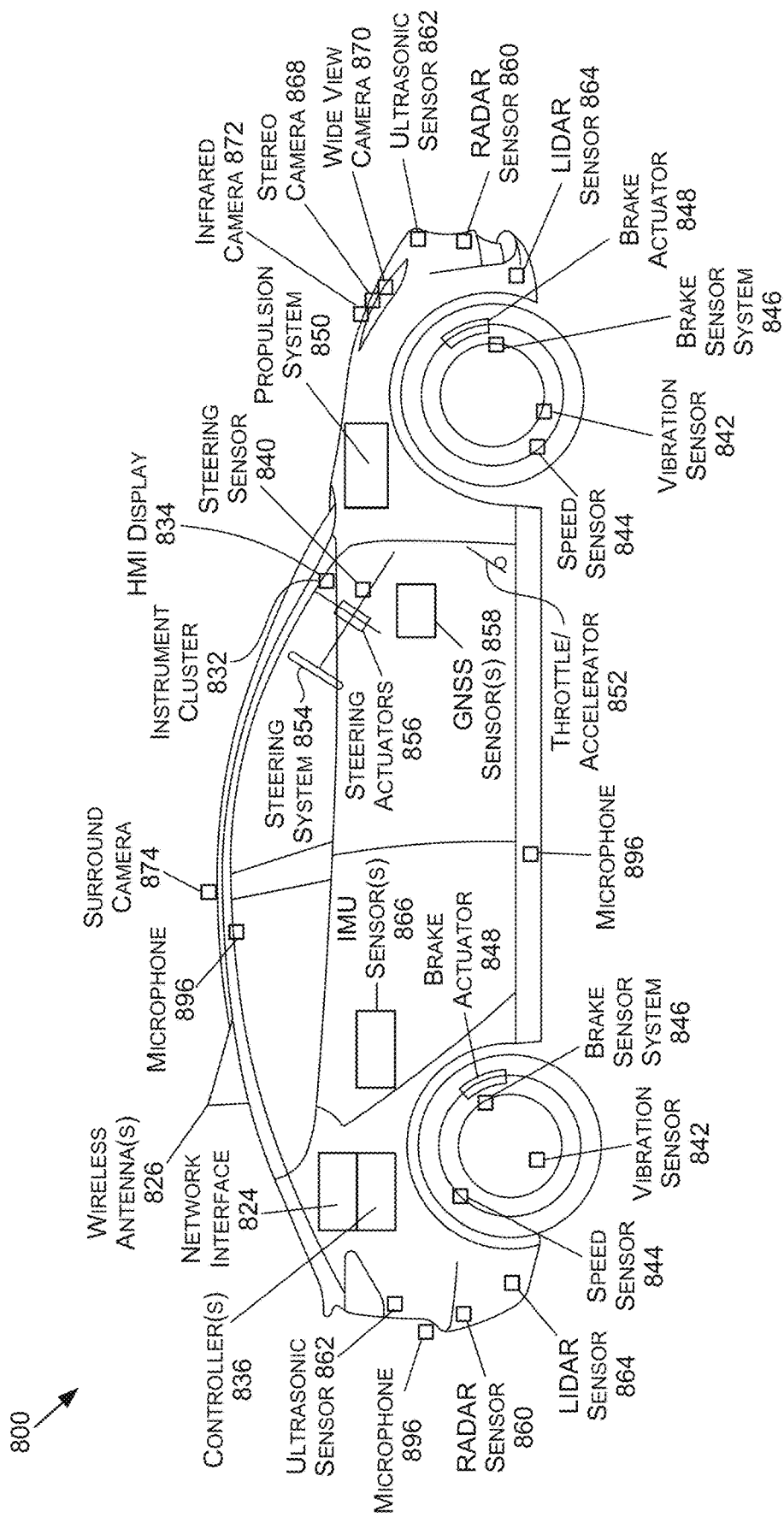
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems ("GNSS") sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the High Definition ("HD") map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 826 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 8B:
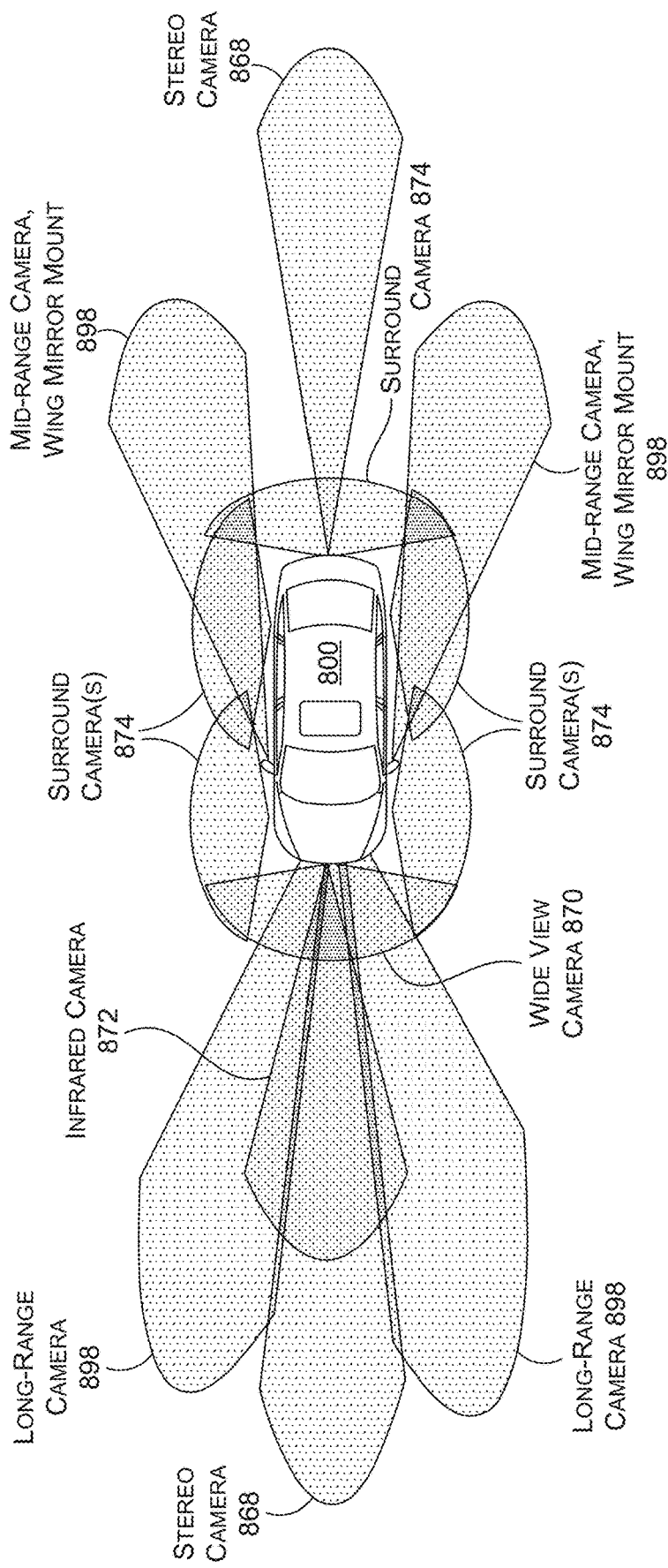
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may be any number (including zero) of wide-view cameras 870 on the vehicle 800. In addition, any number of long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

Any number of stereo cameras 868 may also be included in a front-facing configuration. In at least one embodiment, one or more of stereo camera(s) 868 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
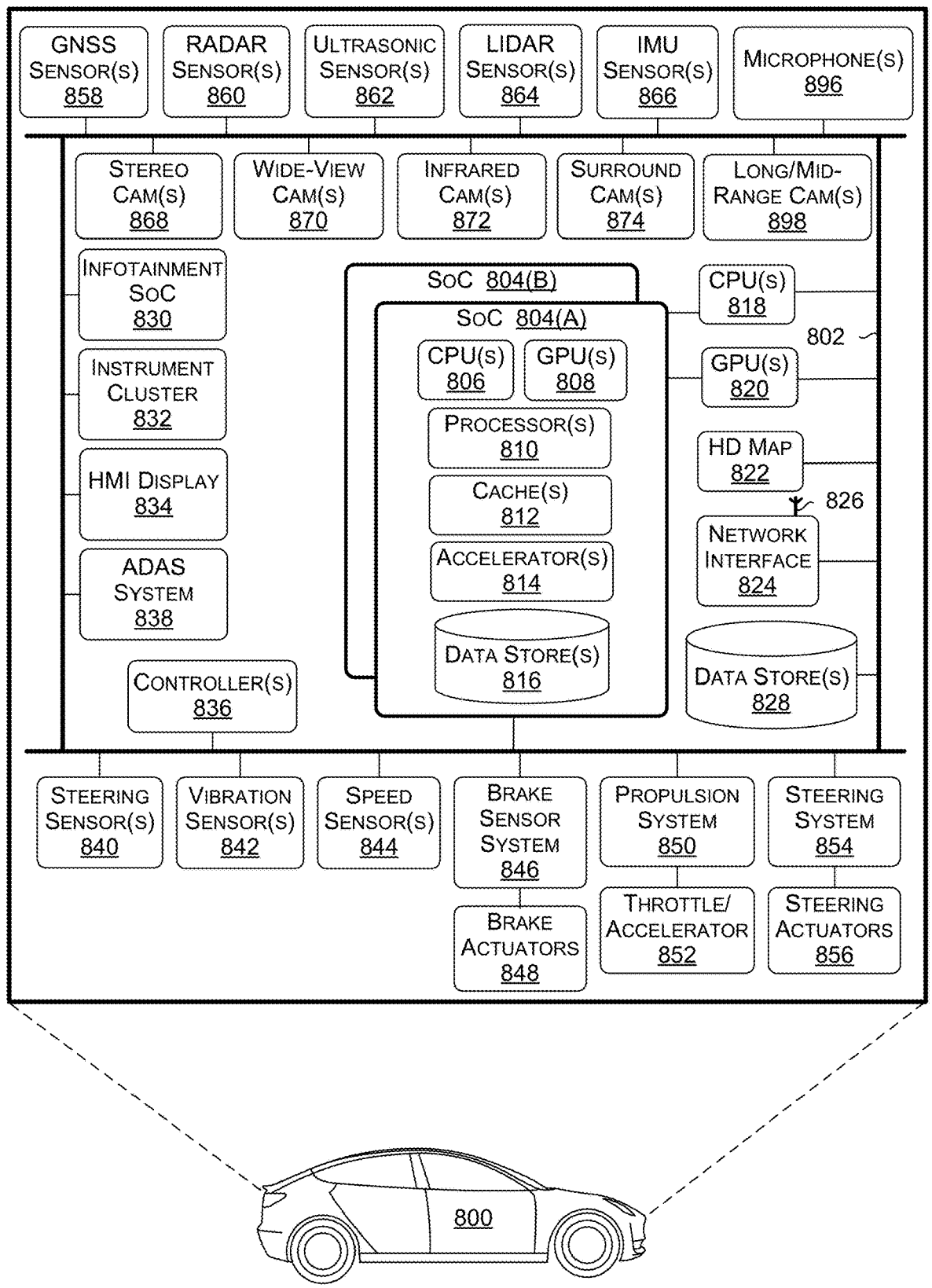
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
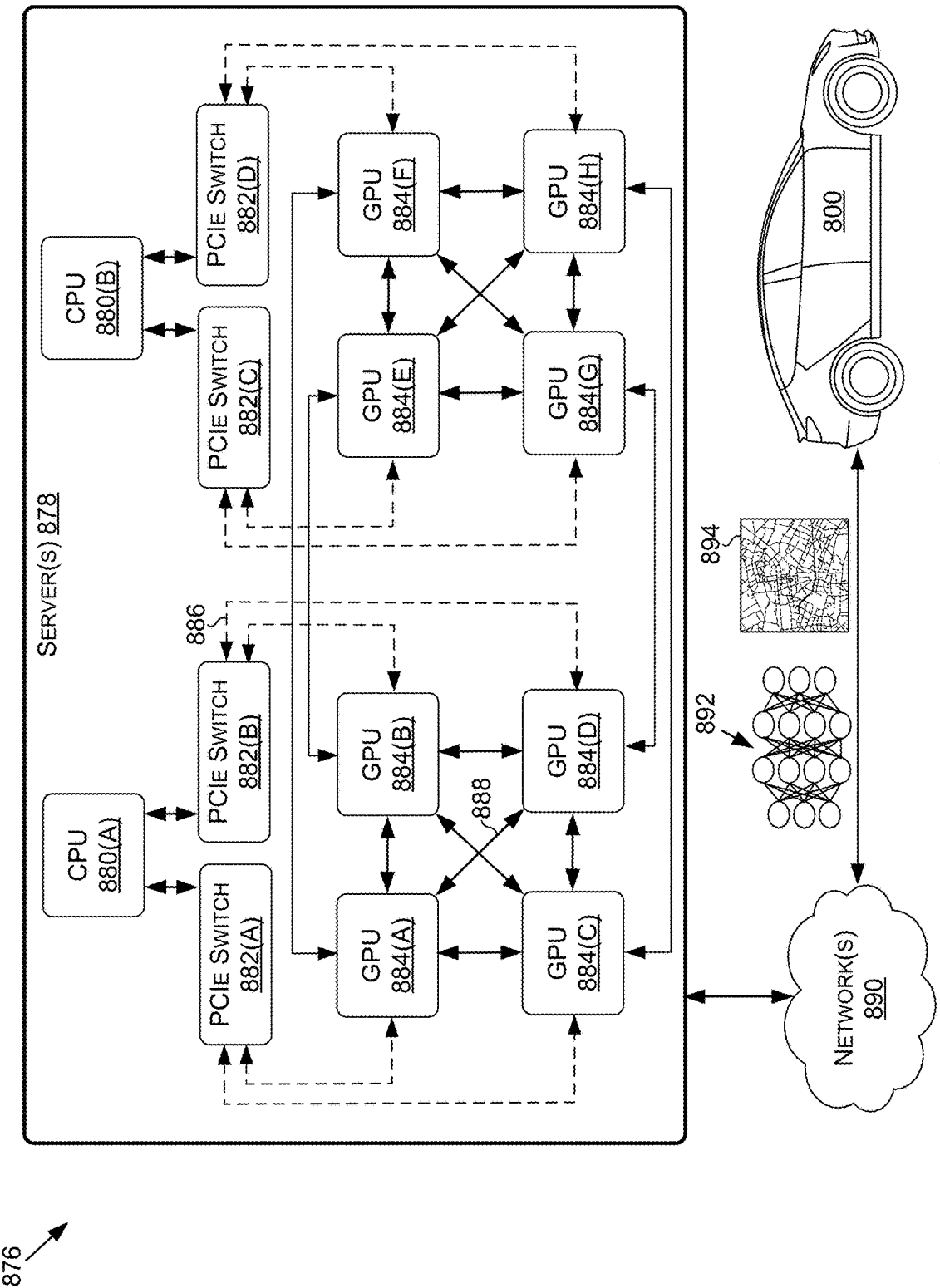
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
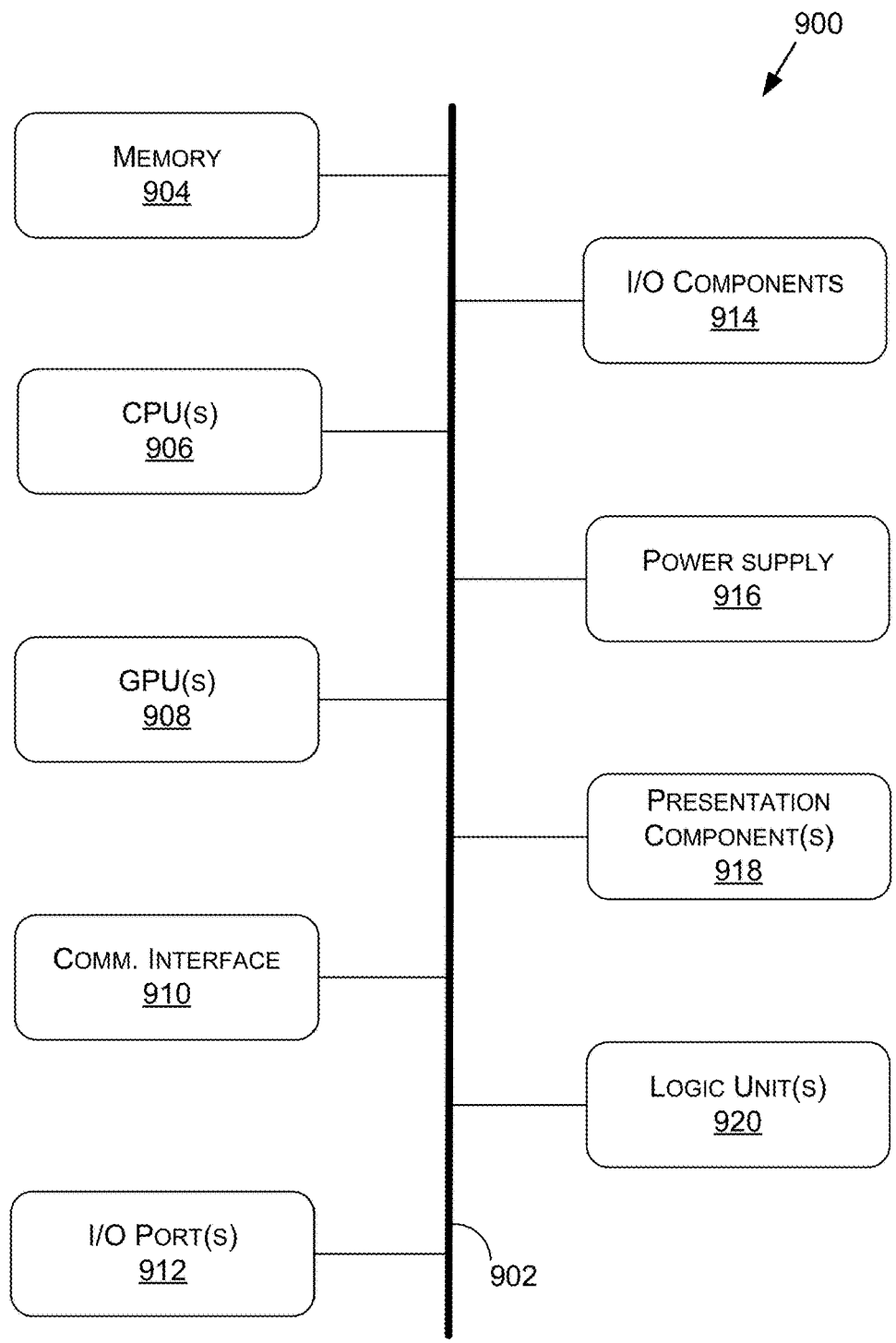
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
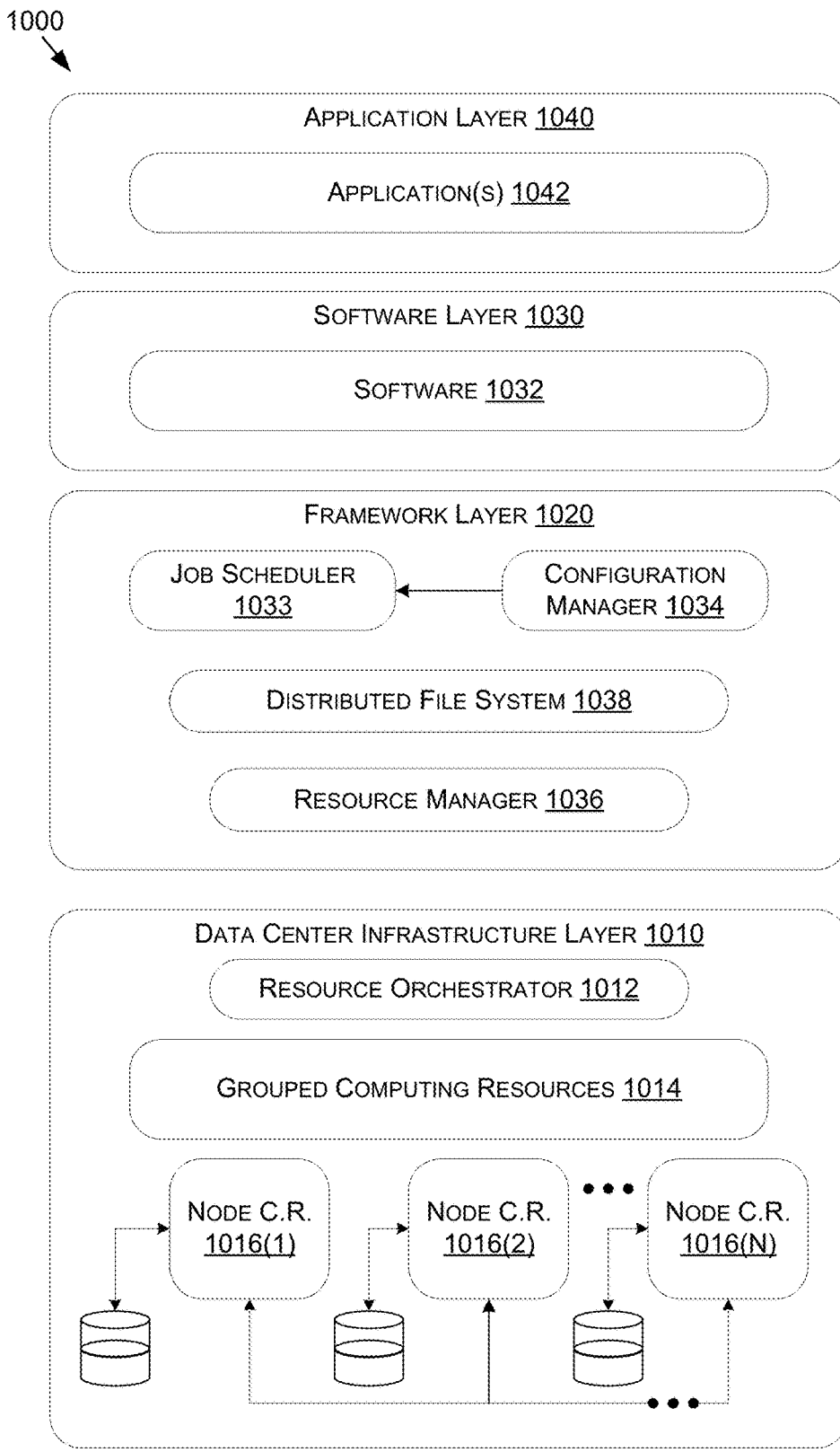
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining, using one or more processors and based at least on image data representing a first image and a second image, first flow vectors associated with a plurality of pixel locations for which a subpixel location of a feature point in the first image at least partially overlaps;
   determining, using the one or more processors and based at least on the subpixel location at least partially overlapping with the plurality of pixel locations, a second flow vector using the first flow vectors, the second flow vector indicating at least an association between the subpixel location in the first image and a location in the second image;
   determining, using the one or more processors and based at least on the second flow vector, the location of the feature point in the second image; and
   generating, using the one or more processors, data representative of the location of the feature point in the second image.

2. The method of claim 1, further comprising:
   determining, using the one or more processors, one or more coefficients associated with the subpixel location using a lookup table stored in a hardware unit of the one or more processors,
   wherein the determining the location of the feature point in the second image is further based at least on the one or more coefficients.

3. The method of claim 1, further comprising:
   determining, using the one or more processors and based at least on the image data and second image data, one or more third flow vectors, the second image data representing a third image that is captured before the first image;
   determining, using the one or more processors, that a third flow vector from the one or more third flow vectors is associated with a second pixel location in the third image that is not associated with one or more tracked feature points;
   determining, using the one or more processors and based at least on the third flow vector being associated with the second pixel location in the third image that is not associated with the one or more tracked feature points, to create a track for the feature point; and
   determining, using the one or more processors and based at least on the third flow vector, the subpixel location of the feature point in the first image.

4. The method of claim 1, further comprising:
   determining, using the one or more processors and based at least on the image data and second image data, one or more third flow vectors associated with the location of the feature point in the second image, second image data representative of a third image; and
   determining, using the one or more processors and based at least on the one or more third flow vectors, to terminate a track associated with the feature point.

5. The method of claim 4, wherein the determining to terminate the track associated with the feature point is based at least on one or more of:
   determining, using the one or more processors, that a third flow vector from the one or more third flow vectors is invalid;
   determining, using the one or more processors, that at least one of a distance between the third flow vector of the one or more third flow vectors and a fourth flow vector of the one or more third flow vectors is outside of a threshold distance; or
   determining, using the one or more processors, that a first angle of the third flow vector is directed in a different direction from a second angle of the fourth flow vector.

6. The method of claim 1, wherein the one or more processors comprise an optical flow accelerator, the optical flow accelerator including a hardware unit to determine the location of the feature point in the second image based at least on the second flow vector.

7. The method of claim 1, wherein:
the one or more processors comprise an optical flow accelerator and a vision accelerator;
the determining the first flow vectors associated with the plurality of pixel locations in the first image is performed using the optical flow accelerator; and
the determining the location of the feature point in the second image is performed using the vision accelerator.

8. The method of claim 1, wherein the determining the second flow vector further uses amounts of overlap of the subpixel location over the plurality of pixel locations.

9. The method of claim 1, wherein the determining the second flow vector comprises determining, using the one or more processors and based at least on the subpixel location at least partially overlapping with the plurality of pixel locations, the second flow vector by performing interpolation on the first flow vectors.

10. A system comprising:
one or more processors to:
determine, based at least on image data representing a first image and a second image, first flow vectors associated with a plurality of pixel locations for which a subpixel location of a feature point in the first image at least partially overlaps;
determine, based at least on the subpixel location at least partially overlapping with the plurality of pixel locations, a second flow vector using the first flow vectors, the second flow vector indicating at least an association between the subpixel location in the first image and a location in the second image;
determining, based at least on the second flow vector, the location of the feature point in the second image; and
generating data representative of the location of the feature point in the second image.

11. The system of claim 10, wherein the one or more processors are further to:
determine one or more coefficients associated with the subpixel location using a lookup table stored in a hardware unit of the one or more processors,
wherein the location of the feature point in the second image is further determined based at least on the one or more coefficients.

12. The system of claim 10, wherein the one or more processors are further to:
determine, based at least on the image data and second image data, one or more third flow vectors, the second image data representing a third image that is captured before the first image;
determine that a third flow vector from the one or more third flow vectors is associated with a second pixel location in the third image that is not associated with one or more tracked feature points;
determine, based at least on the third flow vector being associated with the second pixel location in the third image that is not associated with the one or more tracked feature points, to create a track for the feature point; and
determine, based at least on the third flow vector, the subpixel location of the feature point in the first image.

13. The system of claim 10, wherein the one or more processors are further to:
determine, based at least on the image data and second image data, one or more third flow vectors associated with the location of the feature point in the second image, second image data representative of a third image; and
determine, based at least on the one or more third flow vectors, to terminate a track associated with the feature point.

14. The system of claim 13, wherein the determination to terminate the track associated with the feature point is based at least on one or more of:
determining that a third flow vector from the one or more third flow vectors is invalid;
determining that at least one of a distance between the third flow vector of the one or more third flow vectors and a fourth flow vector of the one or more third flow vectors is outside of a threshold distance; or
determining that a first angle of the third flow vector is directed in a different direction from a second angle of the fourth flow vector.

15. The system of claim 10, wherein the one or more processors comprise an optical flow accelerator, the optical flow accelerator including a hardware unit to determine the location of the feature point in the second image based at least on the second flow vector.

16. The system of claim 10, wherein:
the one or more processors comprise an optical flow accelerator and a vision accelerator;
the determination of the first flow vectors associated with the plurality of pixel locations in the first image is performed using the optical flow accelerator; and
the determination of the location of the feature point in the second image is performed using the vision accelerator.

17. The system of claim 10, wherein the second flow vector is further determined using amounts of overlap of the subpixel location over the plurality of pixel locations.

18. The system of claim 10, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing real-time streaming;
a system for generating or presenting virtual reality (VR) content;
a system for generating or presenting augmented reality (AR) content;
a system for generating or presenting mixed reality (MR) content;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

19. One or more processors comprising:
processing circuitry to:
determine, based at least on image data representing a first image and a second image, first flow vectors associated with a plurality of pixel locations for which a subpixel location of a feature point in the first image at least partially overlaps;

determine, based at least on the subpixel location at least partially overlapping with the plurality of pixel locations, a second flow vector using the first flow vectors, the second flow vector indicating at least an association between the subpixel location in the first image and a location in the second image;

determining, based at least on the second flow vector, the location of the feature point in the second image; and generating data representative of the location of the feature point in the second image.

20. The one or more processors of claim 19, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing real-time streaming;

a system for generating or presenting virtual reality (VR) content;

a system for generating or presenting augmented reality (AR) content;

a system for generating or presenting mixed reality (MR) content;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *